United States Patent
Ogawa et al.

(10) Patent No.: US 10,676,593 B2
(45) Date of Patent: Jun. 9, 2020

(54) CURABLE COMPOSITION AND CURED PRODUCT THEREOF

(71) Applicant: Kaneka Corporation, Osaka (JP)

(72) Inventors: Akira Ogawa, Hyogo (JP); Ayako Yano, Hyogo (JP)

(73) Assignee: KANEKA CORPORATION, Osaka (JP)

(*) Notice: Subject to any disclaimer, the term of this patent is extended or adjusted under 35 U.S.C. 154(b) by 20 days.

(21) Appl. No.: 16/002,783

(22) Filed: Jun. 7, 2018

(65) Prior Publication Data

US 2018/0282518 A1 Oct. 4, 2018

Related U.S. Application Data

(63) Continuation of application No. PCT/JP2016/086454, filed on Dec. 7, 2016.

(30) Foreign Application Priority Data

Dec. 7, 2015 (JP) ................. 2015-238551

(51) Int. Cl.

| | | |
|---|---|---|
| C08K 5/3435 | (2006.01) | |
| C09D 183/12 | (2006.01) | |
| C09J 11/06 | (2006.01) | |
| C09J 183/12 | (2006.01) | |
| C09K 3/10 | (2006.01) | |
| C09D 7/40 | (2018.01) | |
| C08L 71/02 | (2006.01) | |
| C08K 5/134 | (2006.01) | |
| C09D 7/63 | (2018.01) | |

(52) U.S. Cl.
CPC ............ *C08K 5/3435* (2013.01); *C08K 5/134* (2013.01); *C08L 71/02* (2013.01); *C09D 7/40* (2018.01); *C09D 7/63* (2018.01); *C09D 183/12* (2013.01); *C09J 11/06* (2013.01); *C09J 183/12* (2013.01); *C09K 3/10* (2013.01)

(58) Field of Classification Search
None
See application file for complete search history.

(56) References Cited

U.S. PATENT DOCUMENTS

| | | |
|---|---|---|
| 4,957,953 A | 9/1990 | Kikkawa et al. |
| 2001/0053806 A1 | 12/2001 | Chiba et al. |
| 2004/0266950 A1 | 12/2004 | Yano et al. |

FOREIGN PATENT DOCUMENTS

| | | |
|---|---|---|
| JP | S52-73998 A | 6/1977 |
| JP | S61-233043 A | 10/1986 |
| JP | S63-006041 A | 1/1988 |
| JP | H09-286895 A | 11/1997 |
| JP | H11-310696 A | 11/1999 |
| JP | 2001-271057 A | 10/2001 |
| JP | 2008-163182 A | 7/2008 |
| JP | 2013-006887 A | 1/2013 |
| JP | 2014-001358 A | 1/2014 |
| JP | 2015-089911 A | 5/2015 |

OTHER PUBLICATIONS

Machine Translation of JP H11-310696, Fukuda et al. p. 1-7 (Year: 1999).*
Database WPI, Week 200865, Thomson Scientific, London, GB, Jul. 17, 2008 (2 pages).
Supplementary European Search Report issued in European Patent Application No. 16873047.1; dated Oct. 19, 2018 (5 pages).
Office Action issued in European Patent Application No. 16873047. 1; dated Nov. 20, 2018 (5 pages).
International Search Report issued in International Application No. PCT/JP2016/086454, dated Feb. 28, 2017 (1 page).
Office Action issued in corresponding Chinese Application No. 201680070931.6; dated Oct. 8, 2019 (7 pages).

* cited by examiner

*Primary Examiner* — Robert T Butcher
(74) *Attorney, Agent, or Firm* — Osha Liang LLP

(57) ABSTRACT

A transparent curable composition includes 100 parts by weight of a polyoxyalkylene-based polymer (A); and 0.1 to 20 parts by weight of a weathering stabilizer (B). The polyoxyalkylene-based polymer (A) has a reactive silicon group that can be crosslinked by forming a siloxane bond, and the weathering stabilizer (B) is a hindered-amine-based photostabilizer (B1).

14 Claims, No Drawings

CURABLE COMPOSITION AND CURED PRODUCT THEREOF

TECHNICAL FIELD

One or more embodiments of the present invention relate to a transparent curable composition containing a polyoxyalkylene-based polymer having a silicon-containing group which has a hydroxy group or a hydrolyzable group bonded to a silicon atom and can be crosslinked by forming a siloxane bond (hereinbelow to be also referred to as "reactive silicon group"), and a transparent cured product.

BACKGROUND

It is known that an organic polymer containing at least one reactive silicon group in the molecule is crosslinked by the formation of a siloxane bond, which is accompanied by hydrolysis and the like of the reactive silicon group due to moisture and the like even at room temperature, to obtain a rubber-like cured product.

Among the polymers having a reactive silicon group, a polymer having, as a main chain skeleton, a polyoxyalkylene-based polymer skeleton or a polyisobutylene-based polymer skeleton has been disclosed in Patent Document 1, Patent Document 2, and the like. Those polymers are already industrially produced and widely used for applications such as sealing material, adhesive, paint and the like.

By having a carbon-carbon bond as a main chain, the polyisobutylene-based polymer having a reactive silicon group is a material which remains strong against light or heat and also can exhibit endurance against long-term exposure. Similarly to Patent Document 3, for example, it has been shown that the polyisobutylene-based polymer is also usable for heat reflecting glass. On the other hand, by having an ether bond as a main chain, the polyoxyalkylene-based polymer having a reactive silicon group is susceptible to light or heat. Due to such reasons, the polyoxyalkylene-based polymer having a reactive silicon group is generally blended with an antioxidant, an ultraviolet absorbing agent, or a photostabilizer in combination. In particular, it has been already described in Patent Document 4 and thus well known that a hindered-amine-based photostabilizer with high molecular weight is effective for improving weather resistance. Furthermore, a technique of combining the polyoxyalkylene-based polymer having a reactive silicon group with a hindered-amine-based photostabilizer of >N—OR type (R is a long chain alkyl group) has been also described in Patent Document 5. Furthermore, a technique of combining the polyoxyalkylene-based polymer having a reactive silicon group with a triazine-based hindered-amine-based photostabilizer and a benzotriazole-based ultraviolet absorbing agent is also well known from Patent Document 6.

Patent Document 1: Japanese Unexamined Patent Application, Publication No. S52-73998
Patent Document 2: Japanese Unexamined Patent Application, Publication No. S63-6041
Patent Document 3: Japanese Unexamined Patent Application, Publication No. H09-286895
Patent Document 4: Japanese Unexamined Patent Application, Publication No. S61-233043
Patent Document 5: Japanese Unexamined Patent Application, Publication No. 2015-89911
Patent Document 6: Japanese Unexamined Patent Application, Publication No. 2001-271057

The polyoxyalkylene-based polymer having a reactive silicon group is widely used as a sealing material for construction or a sealing material for industrial use. For those uses, weather resistance against sunlight over a long period of time is required, or stability against heat is required for industrial use. Due to such reasons, in a polyoxyalkylene-based polymer having a reactive silicon group, plural stabilizers are added in combination in general. In particular, the hindered-amine-based photostabilizer is suitable for enhancing the weather resistance of a polyoxyalkylene-based polymer having a reactive silicon group, and in particular, those with high molecular weight are considered to be effective as they are hardly washed out by water or the like. Furthermore, when a composition containing the polyoxyalkylene-based polymer having a reactive silicon group is colored, it is not so difficult to ensure the weather resistance due to the high shielding effect of calcium carbonate as white pigment, rutile type titanium oxide, or carbon black as black pigment, for example. On the other hand, with regard to a transparent composition, light can reach even the inside of a cured product so that it is difficult to maintain the weather resistance over a long period of time. In addition, there are some stabilizers that are colored red or yellow when used in combination with an amino group-containing silane coupling agent as an adhesiveness imparting agent. Under those circumstances, finding out a combination of additives that is not likely to cause discoloration of a cured product has remained not easy. Furthermore, for a sealing material, blending a large amount of calcium carbonate is generally carried out for imparting the reinforcing property or thixotropic property, or for lowering the cost. In addition, calcium carbonate is a filler with high whiteness. Due to such reasons, a sealing material containing calcium carbonate is not likely to have realization of the coloration that is caused by combined use of a stabilizer and an amine compound as described above, and thus there is almost no case in which the discoloration of a cured product is present.

SUMMARY

One or more embodiments of the present invention provide a curable composition containing a polyoxyalkylene-based polymer having a silicon group, which have excellent weather resistance, heat resistance, and transparency, and also a transparent cured product.

As a result of determining combinations of various weathering stabilizers to enhance the weather resistance of a cured product in which a polyoxyalkylene-based polymer having a reactive silicon group is used, in one or more embodiments of the present invention, a weathering stabilizer with a long-chain hydrocarbon group in the molecule, is used. The aforementioned weathering stabilizer can inhibit the coloration and also enhance the heat resistance of a transparent cured product. Namely, one or more embodiments of the present invention relate to the following:

(1). A transparent curable composition containing a polyoxyalkylene-based polymer (A) and a weathering stabilizer (B),
in which the polyoxyalkylene-based polymer (A) has a reactive silicon group that can be crosslinked by forming a siloxane bond,
the weathering stabilizer (B) is a hindered-amine-based photostabilizer (B1) represented by the following formula (1):

[Chem. 1]

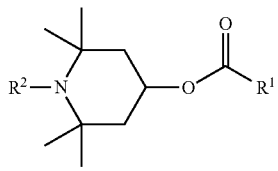

(1)

(in the formula (1), $R^1$ is an unsubstituted hydrocarbon group having 12 to 20 carbon atoms, and $R^2$ is a group selected from hydrogen, methyl group, ethyl group, and alkyloxy group having 1 to 12 carbon atoms) and/or a hindered-phenol-based antioxidant (B2) represented by the following formula (2):

[Chem. 2]

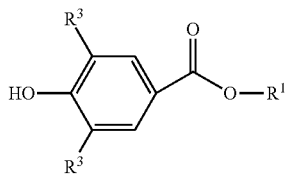

(2)

(in the formula (2), $R^1$ is as defined in the formula (1), two $R^3$ are each independently a group selected from hydrogen, methyl group, ethyl group, and t-butyl group, and at least one of the two $R^3$ is a t-butyl group), and content of the weathering stabilizer (B) relative to 100 parts by weight of the polyoxyalkylene-based polymer (A) is 0.1 to 20 parts by weight, (2). The curable composition described in (1), in which the polyoxyalkylene-based polymer (A) is a polyoxypropylene-based polymer, (3). The curable composition described in any one of (1) and (2), in which the reactive silicon group of the component (A) is at least one selected from the group consisting of a trimethoxysilyl group, a triethoxysilyl group, and a dimethoxymethylsilyl group, (4). The curable composition described in any one of (1) to (3), in which the component (A) is a mixture of a polyoxyalkylene-based polymer (A1) with linear structure and a polyoxyalkylene-based polymer (A2) with branched structure, (5). The curable composition described in any one of (1) to (4), further containing an ultraviolet absorbing agent, (6). The curable composition described in any one of (1) to (5), in which an amino group-containing silane coupling agent (C) is contained at 0.1 to 20 parts by weight relative to 100 parts by weight of the component (A), (7). The curable composition described in any one of (1) to (6), in which silica (D) is contained at 0.1 to 20 parts by weight relative to 100 parts by weight of the component (A), (8). The curable composition described in any one of (1) to (7), in which moisture content is 2000 ppm or less, (9). A sealing material containing the curable composition described in any one of (1) to (8), (10). An adhesive containing the curable composition described in any one of (1) to (8), (11). A coating material containing the curable composition described in any one of (1) to (8), (12). A water-proof material containing the curable composition described in any one of (1) to (8), (13). A cured product of the curable composition described in any one of (1) to (8), (14). The transparent cured product described in (13), in which a sample having thickness of 5 mm has total light transmittance of 70% or higher, (15). The curable composition described in any one of (1) to (8) allowing obtainment of the transparent cured product described in (14) within 7 days after curing, and

(16) A weathering stabilizer used for a transparent curable composition containing a polyoxyalkylene-based polymer (A) having a reactive silicon group that can be crosslinked by forming a siloxane bond, containing:

a hindered-amine-based photostabilizer (B1) represented by the following formula (1):

[Chem. 3]

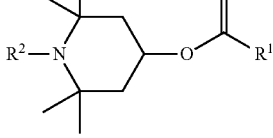

(1)

(in the formula (1), $R^1$ is an unsubstituted hydrocarbon group having 12 to 20 carbon atoms, and $R^2$ is a group selected from hydrogen, methyl group, ethyl group, and alkyloxy group having 1 to 12 carbon atoms) and/or a hindered-phenol-based antioxidant (B2) represented by the following formula (2):

[Chem. 4]

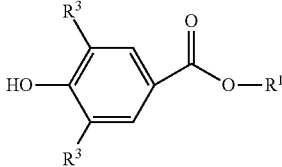

(2)

(in the formula (2), $R^1$ is as defined in the formula (1), two $R^3$ are each independently a group selected from hydrogen, methyl group, ethyl group, and t-butyl group, and at least one of the two $R^3$ is a t-butyl group).

In one or more embodiments of the present invention a curable composition containing a polyoxyalkylene-based polymer having a silicon group and a transparent cured product, which have excellent weather resistance, heat resistance, and transparency, are provided.

DETAILED DESCRIPTION OF EMBODIMENTS

Hereinbelow, one or more embodiments of the present invention are explained in detail.

<Polyoxyalkylene-Based Polymer (A)>

In one or more embodiments, the polyoxyalkylene-based polymer (A) has a reactive silicon group that can be crosslinked by forming a siloxane bond. The main chain skeleton of the polyoxyalkylene-based polymer (A) is not particularly limited, and a polymer having various main chain skeletons can be used. From the viewpoint of having excellent curability or adhesion property of a composition to be obtained, it is preferable that the main chain skeleton consists of one or more selected from a hydrogen atom, a carbon atom, a nitrogen atom, an oxygen atom, and a sulfur atom.

In one or more embodiments, a polyoxyalkylene-based polymer such as polyoxyethylene, polyoxypropylene, polyoxybutylene, polyoxytetramethylene, polyoxyethylene-polyoxypropylene copolymer, or polyoxypropylene-polyoxybutylene copolymer may be used. In some embodiments, a polyoxyalkylene-based polymer (A) having a reactive silicon group may be blended with the polymer having a reactive silicon group, which has a following skeleton. One or more embodiments include hydrocarbon-based polymers such as ethylene-propylene-based copolymer, polyisobutylene, copolymer of isobutylene and isoprene, polychloroprene, polyisoprene, copolymer of isoprene or butadiene and acrylonitrile and/or styrene and the like, polybutadiene, copolymer of isoprene or butadiene and acrylonitrile and styrene, hydrogenated polyolefin-based polymer obtained by hydrogenation of these polyolefin-based polymer and the like; polyester-based polymers obtained by condensation of dibasic acids such as adipic acid and glycol or ring opening polymerization of lactones; (meth)acrylate polymers obtained by radical polymerization of monomers such as ethyl(meth)acrylate, butyl(meth)acrylate and the like; vinyl polymer obtained by radical polymerization of monomers such as (meth)acrylate monomer, vinyl acetate, acrylonitrile, styrene and the like; graft polymers obtained by polymerization of vinyl monomers in the aforementioned organic polymer; polysulfide-based polymers; polyamide-based polymers such as nylon 6 obtained by ring opening polymerization of ε-caprolactam, nylon 6•6 obtained by polycondensation of hexamethylenediamine and adipic acid, nylon 6•10 obtained by polycondensation of hexamethylenediamine and sebacic acid, nylon 11 obtained by polycondensation of ε-aminoundecanoic acid, nylon 12 obtained by ring opening polymerization of ε-aminolaurolactam, copolymerized nylon having not less than 2 components from the above-mentioned nylons; polycarbonate-based polymers produced by polycondensation of, for example, bisphenol A and carbonyl chloride; diallyl phthalate-based polymers and the like.

The glass transition temperature of the polyoxyalkylene-based polymer (A) is not particularly limited, but it preferably not more than 20° C., more preferably not more than 0° C., and particularly preferably not more than −20° C. When the glass transition temperature is more than 20° C., the viscosity becomes high in winter or cold region, and the workability is degraded in some cases. Furthermore, the flexibility of the cured product may decrease and the elongation is degraded in some cases. The aforementioned glass transition temperature is a value obtained by DSC measurement.

The polyoxyalkylene-based polymer (A) and a (meth) acrylate polymer have high moisture permeability, and are particularly preferable in that excellent depth curability and also excellent adhesion property are obtained if they are prepared as 1-liquid type composition, and the polyoxyalkylene-based polymer is most preferable. Among the polyoxyalkylene-based polymers, the polyoxypropylene-based polymer is particularly preferable.

The reactive silicon group contained in the polyoxyalkylene-based polymer (A) or a polymer having a reactive silicon group that is used with the polyoxyalkylene-based polymer (A) has a hydroxy group or hydrolyzable group bonded to a silicon atom. The reactive silicon group is a group that can be crosslinked by forming a siloxane bond by a reaction accelerated by a silanol condensation catalyst. Examples of the reactive silicon group include a group represented by the general formula (3):

$$-SiR^4{}_{3-a}X_a \qquad (3)$$

(in which each $R^4$ is independently an alkyl group having 1 to 20 carbon atoms, an aryl group having 6 to 20 carbon atoms, an aralkyl group having 7 to 20 carbon atoms, or a triorganosiloxy group represented by $-OSi(R')_3$ (each R' is independently a hydrocarbon group having 1 to 20 carbon atoms). Each X is independently a hydroxy group or a hydrolyzable group, and
a is an integer of 1 to 3).

The hydrolyzable group is not particularly limited and may be a conventionally known hydrolyzable group. In one or more embodiments, the hydrolyzable group may include a hydrogen atom, halogen atom, alkoxy group, acyloxy group, ketoxymate group, amino group, amide group, acid amide group, aminooxy group, mercapto group, alkenyloxy group and the like. Of these, hydrogen atom, alkoxy group, acyloxy group, ketoxymate group, amino group, amide group, aminooxy group, mercapto group, and alkenyloxy group are preferable, and alkoxy group is particularly preferable since it shows mild hydrolyzability and thus is easy to handle.

The hydrolyzable group or hydroxy group in the number range of 1 to 3 can be bonded to one silicon atom. When two or more hydrolyzable groups or hydroxy groups are bonded to a reactive silicon group, they may be the same or different.

The "a" in the general formula (3) is preferably 2 or 3 from the viewpoint of curability. When rapid curability is particularly desired, it is preferably 3, and when storage stability is desired, it is preferably 2.

In one or more embodiments, $R^4$ in the general formula (3) may include alkyl groups such as methyl group, ethyl group and the like, cycloalkyl groups such as cyclohexyl group and the like, aryl groups such as phenyl group and the like, aralkyl groups such as benzyl group and the like, triorganosiloxy group represented by $-OSi(R')_3$ in which R' is a methyl group, a phenyl group etc., and the like. Of these, a methyl group is particularly preferable.

More specific examples of the reactive silicon group in some embodiments include a trimethoxysilyl group, a triethoxysilyl group, a triisopropoxysilyl group, a dimethoxymethylsilyl group, a diethoxymethylsilyl group, and a diisopropoxymethylsilyl group. From the viewpoint of obtaining high activity and good curability, a trimethoxysilyl group, a triethoxysilyl group, and a dimethoxymethylsilyl group are preferable, and a trimethoxysilyl group is particularly preferable. From the viewpoint of storage stability, a dimethoxymethylsilyl group and a triethoxysilyl group are particularly preferable. A triethoxysilyl group and a diethoxymethylsilyl group are particularly preferable from the viewpoint that an alcohol produced by the hydrolysis of the reactive silicon group is ethanol and they have much higher safety.

In one or more embodiments, the reactive silicon group can be introduced by a known method. Examples thereof include the following methods.

(I) An organic polymer having a functional group such as hydroxy group and the like in the molecule is reacted with an organic compound having an active group exhibiting reactivity for the functional group and an unsaturated group to obtain an organic polymer having the unsaturated group. Alternatively, an unsaturated group-containing organic polymer is obtained by copolymerization with an epoxy compound containing an unsaturated group. Then, the obtained reaction product is reacted with hydrosilane having a reactive silicon group to have hydrosilylation.

(II) An organic polymer containing an unsaturated group, which is obtained in the same manner as in the method of (I), is reacted with a compound having a mercapto group and a reactive silicon group.

(III) An organic polymer having a functional group such as hydroxy group, epoxy group, isocyanate group and the like in the molecule is reacted with a compound having a functional group reactive with the functional group and a reactive silicon group.

Among the above methods, the method of (I) and the method of (III) in which a polymer having a hydroxy group on the terminal is reacted with a compound having an isocyanate group and a reactive silicon group are preferable since high conversion ratio is obtained in a comparatively short reaction time. Furthermore, from the viewpoint that the organic polymer having a reactive silicon group obtained by the method of (I) can provide a curable composition which has good workability at low viscosity than an organic polymer obtained by the method of (III), and is free of strong malodor based on mercaptosilane like the organic polymer obtained by the method of (II), it is particularly preferable.

Specific examples of the hydrosilane compound to be used in the method of (I) include, but are not limited to, halogenated silanes such as trichlorosilane, methyldichlorosilane, dimethylchlorosilane, phenyldichlorosilane and the like; alkoxysilanes such as trimethoxysilane, triethoxysilane, methyldiethoxysilane, methyldimethoxysilane, phenyldimethoxysilane, 1-[2-(trimethoxysilyl)ethyl]-1,1,3,3-tetramethyldisiloxane and the like; acyloxysilanes such as methyldiacetoxysilane, phenyldiacetoxysilane and the like; and ketoxymatesilanes such as bis(dimethylketoxymate)methylsilane or bis(cyclohexylketoxymate)methyl silane. The hydrosilane compound is not limited to them. Of those described above, particularly halogenated silanes and alkoxysilanes are preferable, and particularly, alkoxysilanes are most preferable since the curable composition to be obtained has mild hydrolyzability and is easy to handle. Of the alkoxysilanes, methyldimethoxysilane is preferable since it is easily available, and a curable composition containing the organic polymer to be obtained is high in the curability, storage stability, elongation property, and tensile strength. Furthermore, trimethoxysilane is particularly preferable from the viewpoint of the curability and restoration property of the curable composition to be obtained.

Examples of the synthetic method of (II) include, but are not limited to, a method including introducing a compound having a mercapto group and a reactive silicon group into an unsaturated binding site of an organic polymer by a radical addition reaction in the presence of a radical initiator and/or a radical source and the like. Specific examples of the aforementioned compound having a mercapto group and a reactive silicon group include, but are not limited to, γ-mercaptopropyltrimethoxysilane, γ-mercaptopropylmethyldimethoxysilane, γ-mercaptopropyltriethoxysilane, γ-mercaptopropylmethyldiethoxysilane, mercaptomethyltrimethoxysilane, mercaptomethyltriethoxysilane and the like.

With regard to the synthetic method of (III), the method described in JP H03-47825 A can be mentioned as a method in which a polymer having a hydroxy group at an end is reacted with a compound having an isocyanate group and a reactive silicon group, for example, but it is not limited thereto. Specific examples of the aforementioned compound having an isocyanate group and a reactive silicon group include, but are not limited to, γ-isocyanatopropyltrimethoxysilane, γ-isocyanatopropylmethyldimethoxysilane, γ-isocyanatopropyltriethoxysilane, γ-isocyanatopropylmethyldiethoxysilane, isocyanatomethyltrimethoxysilane, isocyanatomethyltriethoxysilane, isocyanatomethyldimethoxymethylsilane, isocyanatomethyldiethoxymethylsilane and the like.

In the case of a silane compound in which three hydrolyzable groups are bonded to one silicon atom such as trimethoxysilane and the like, a disproportionation reaction may sometimes proceed. When a disproportionation reaction proceeds, an unstable compound such as dimethoxysilane is produced to make the handling difficult. However, such disproportionation reaction does not proceed with γ-mercaptopropyltrimethoxysilane and γ-isocyanatopropyltrimethoxysilane. Therefore, when a group in which three hydrolyzable groups are bonded to one silicon atom, such as trimethoxysilyl group and the like, is used as a silicon-containing group, the synthetic method of (II) or (III) is preferably used.

On the other hand, a silane compound represented by the formula (4) does not have any progress of a disproportionation reaction:

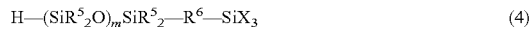

$$\text{H---(SiR}^5_2\text{O)}_m\text{SiR}^5_2\text{---R}^6\text{---SiX}_3 \qquad (4)$$

(in which X is as defined above,
each $R^5$ in the number of 2m+2 is independently a hydrocarbon group, and from the viewpoint of obtainability and cost, it is preferably a hydrocarbon group having 1 to 20 carbon atoms, more preferably a hydrocarbon group having 1 to 8 carbon atoms, and particularly preferably a hydrocarbon group having 1 to 4 carbon atoms. $R^6$ is a divalent organic group, and from the viewpoint of obtainability and cost, it is preferably a divalent hydrocarbon group having 1 to 12 carbon atoms, more preferably a divalent hydrocarbon group having 2 to 8 carbon atoms, and particularly preferably a divalent hydrocarbon group having 2 carbon atoms. m is an integer of 0 to 19, and from the viewpoint of obtainability and cost, it is preferably 1).

Due to such reasons, when a group in which three hydrolyzable groups are bonded to one silicon atom is introduced in the synthetic method of (I), a silane compound represented by the formula (4) is preferably used. Specific examples of the silane compound represented by the formula (4) include 1-[2-(trimethoxysilyl)ethyl]-1,1,3,3-tetramethyldisiloxane, 1-[2-(trimethoxysilyl)propyl]-1,1,3,3-tetramethyldisiloxane, 1-[2-(trimethoxysilyl)hexyl]-1,1,3,3-tetramethyldisiloxane and the like.

The polyoxyalkylene-based polymer (A) may be linear or branched. As for the polyoxyalkylene-based polymer (A), it is also desirable to use in combination a polyoxyalkylene-based polymer (A1) with linear structure and a polyoxyalkylene-based polymer (A2) with branched structure. In that case, there is an advantage that balance between the strength and elongation of a cured product can be obtained. In a case in which a polyoxyalkylene-based polymer (A1) with linear structure and a polyoxyalkylene-based polymer (A2) with branched structure are used in combination, the ratio between them (i.e., weight ratio) is, in terms of polyoxyalkylene-based polymer (A1) with linear structure:polyoxyalkylene-based polymer (A2) with branched structure, preferably 5:95 to 95:5, more preferably 10:90 to 90:10, and particularly preferably 20:80 to 80:20.

The number average molecular weight (Mn) of the polyoxyalkylene-based polymer (A) is, in terms a value measured by GPC using polystyrene as a reference, 500 to 100,000 or so, preferably 1,000 to 50,000, and particularly preferably 3,000 to 30,000. When the number average molecular weight is less than 500, elongation of the cured product tends to be insufficient, and when it exceeds 100,000, high viscosity is yielded, which tends to be inappropriate in terms of workability.

To obtain a rubber-like cured product showing high strength, high elongation and low elastic modulus, the number of the reactive silicon group contained in the polyoxyalkylene-based polymer (A) is at least 1, and more preferably 1.1 to 5, on average in one molecule of the polymer. When the number of the reactive silicon group contained in the molecule is less than 1 on average, the curability becomes insufficient and good rubber elasticity behavior is unlikely to be exhibited. The reactive silicon group may be present on the main chain terminal or the side chain terminal of the polymer molecular chain, or both of them. Particularly, when the reactive silicon group is present only on the main chain terminal of the molecular chain, a rubber-like cured product showing high strength, high elongation and low elastic modulus is easily obtained, since the effective network length of a polymer component contained in the finally-formed cured product becomes long.

The polyoxyalkylene-based polymer (A) is a polymer essentially having a repeat unit represented by the general formula (5):

$$—R^7—O—  \qquad (5)$$

(in which $R^7$ is a linear or branched alkylene group having 1 to 14 carbon atoms).

$R^7$ in the general formula (5) is a linear or branched alkylene group preferably having 1 to 14 carbon atoms, or more preferably having 2 to 4 carbon atoms. Specific examples of the repeat unit represented by the general formula (5) include —CH$_2$O—, —CH$_2$CH$_2$O—, —CH$_2$CH(CH$_3$)O—, —CH$_2$CH(C$_2$H$_5$)O—, —CH$_2$C(CH$_3$)$_2$O—, and —CH$_2$CH$_2$CH$_2$CH$_2$O—.

The main chain skeleton of the polyoxyalkylene-based polymer (A) may be composed of only one kind of repeat unit or two or more kinds of repeat units. Particularly, when used as a sealant and the like, it is preferably composed of a polymer which has propylene oxide polymer as a main component from the viewpoint of having amorphous property and relatively low viscosity.

Examples of the synthetic method of the polyoxyalkylene-based polymer (A) include, but are not limited to, a polymerization method using an alkali catalyst such as KOH and the like, the polymerization method shown in JP S61-215623 A, which uses a transition metal compound-porphyrin complex catalyst such as a complex obtained by reaction of an organic aluminum compound and porphyrin, the polymerization methods shown in JP S46-27250 B, JP S59-15336 B, U.S. Pat. Nos. 3,278,457, 3,278,458, 3,278,459, 3,427,256, 3,427,334, 3,427,335 and the like, which use a composite metal cyanide complex catalyst, the polymerization method shown in JP H10-273512 A, which uses a catalyst composed of a polyphosphagen salt, and the polymerization method shown in JP H11-060722 A, which uses a catalyst composed of a phosphagen compound and the like.

Examples of the method for producing the polyoxyalkylene-based polymer (A) having a reactive silicon group include, but are not limited to, the methods suggested in each publication of JP S45-36319 B, JP S46-12154 B, JP S50-156599 A, JP S54-6096 A, JP S55-13767 A, JP S55-13468 A, JP S57-164123 A, JP H03-2450 B, U.S. Pat. Nos. 3,632,557, 4,345,053, 4,366,307, 4,960,844 and the like. Furthermore, the polyoxyalkylene-based polymers having a number average molecular weight of 6,000 or more and a molecular weight distribution (Mw/Mn) of 1.6 or less, i.e., narrow molecular weight distribution at high molecular weight, as proposed in each publication of JP S61-A, JP S61-215622 A, JP S61-215623 A, JP S61-218632 A, JP H03-72527 A, JP H03-47825 A, and JP H08-231707 A can be mentioned, but it is not particularly limited thereto.

The above polyoxyalkylene-based polymer (A) having a reactive silicon group may be used either singly or in combination of two or more types thereof.

The polyoxyalkylene-based polymer (A) having a reactive silicon group may be used after being admixed with a polymer having a reactive silicon group which has a skeleton other than the polyoxyalkylene-based polymer. As for the polymer having a reactive silicon group which has a skeleton other than the polyoxyalkylene-based polymer, a (meth)acrylate polymer, which is a polymer of a monomer containing (meth)acrylate-based monomer as described above, is preferable.

The (meth)acrylate-based monomer constituting the main chain of a (meth)acrylate-based polymer is not particularly limited, and various kinds thereof can be used. Examples thereof include (meth)acrylic acid-based monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxy)propyltrimethoxysilane, γ-(methacryloyloxy)propyldimethoxymethylsilane, methacryloyloxymethyltrimethoxysilane, methacryloyloxymethyltriethoxysilane, methacryloyloxymethyldimethoxymethylsilane, methacryloyloxymethyldiethoxymethylsilane, ethylene oxide adduct of (meth)acrylate and the like.

In the (meth)acrylate-based polymer, the following vinyl monomers can also be copolymerized with (meth)acrylate-based monomers. Examples of the vinyl monomer include styrene-based monomers such as styrene, vinyltoluene, α-methylstyrene, chlorostyrene, styrene sulfonic acid and a salt thereof and the like; silicon containing vinyl monomers such as vinyltrimethoxysilane, vinyltriethoxysilane and the like; maleic anhydride, maleic acid, monoalkyl ester and dialkyl ester of maleic acid; fumaric acid, monoalkyl ester and dialkyl ester of fumaric acid; maleimide-based monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide and the like; nitrile group-containing vinyl monomers such as acrylonitrile, methacrylonitrile and the like; amide group-containing vinyl monomers such as acrylamide, methacrylamide and the like; vinyl esters such as vinyl acetate, vinyl propionate, vinyl pivalate, vinyl benzoate, vinyl cinnamate and the like; alkenes such as ethylene, propylene and the like; conjugated dienes such as butadiene, isoprene and the like; vinyl chloride, vinylidene chloride, allyl chloride, allyl alcohol and the like.

They may be used either singly or several of them may be copolymerized. In particular, from the viewpoint of a physical property or the like of a product, a polymer of a monomer consisting of a styrene-based monomer and a (meth)acrylic monomer is preferable. It is more preferably a (meth)acrylic polymer which is a polymer of a monomer consisting of an acrylate monomer and a methacrylate monomer, and it is particularly preferably an acrylic monomer which is a polymer of a monomer consisting of an acrylate monomer. For a use for general construction and the like in which physical properties such as low viscosity of a blend, low modulus, high elongation, weather resistance, heat resistance and the like of a cured product are required, a polymer of a monomer containing a butyl acrylate monomer is a preferable. On the other hand, in automobile use and the like in which oil resistance and the like are required, a copolymer of a monomer mainly having ethyl acrylate is preferable. While the polymer of a monomer mainly containing ethyl acrylate is superior in oil resistance, it tends to show rather inferior low temperature property (cold resistance). Due to such reasons, to improve the low temperature property, it is possible to replace a part of the ethyl acrylate with butyl acrylate. However, the good oil resistance thereof decreases as the ratio of butyl acrylate increases. Thus, for a use in which oil resistance is required, the ratio of butyl acrylate is preferably 40% by weight or less, and more preferably 30% by weight or less. Furthermore, to improve the low temperature property and the like without impairing the oil resistance, it is also desirable to use 2-methoxyethyl acrylate, 2-ethoxyethyl acrylate or the like in which oxygen is introduced into an alkyl group on the side chain. However, introduction of an alkoxy group having an ether bond in the side chain tends to degrade the heat resistance. Thus, when heat resistance is required, the ratio of an alkyl acrylate of a monomer in which oxygen is introduced into an alkyl group on the side chain is preferably 40% by weight or less. Depending on various uses and purposes that are required, a suitable polymer can be obtained by changing the ratio thereof in consideration of the required properties such as oil resistance, heat resistance, low temperature property and the like. Examples of those having excellent balance of physical properties such as oil resistance, heat resistance, low temperature property and the like include ethyl acrylate/butyl acrylate/2-methoxyethyl acrylate (40 to 50/20 to 30/30 to 20 in weight ratio) copolymer, although they are not limited thereto. In one or more embodiments of the present invention, those monomers may be subjected to copolymerization, or block copolymerization, with other monomer, and in that case, those monomers are preferably contained at 40% or more in terms of weight ratio. Furthermore, according to the expression form given above, the "(meth)acrylate" indicates "acrylate and/or methacrylate", for example.

The synthetic method of the (meth)acrylate polymer is not particularly limited, and a known method can be used. In some embodiments, a polymer obtained by a general free radical polymerization method using an azo compound, peroxide and the like as a polymerization initiator is associated with the molecular weight distribution value being generally 2 or more and yielding high viscosity. In one or more embodiments, to obtain a (meth)acrylate polymer with a narrow molecular weight distribution and low viscosity, a (meth)acrylate polymer having a crosslinking functional group at a high ratio on the molecular chain terminal, the living radical polymerization method is used.

Of the "living radical polymerization method", in some embodiments, the "atom transfer radical polymerization" including polymerizing a (meth)acrylate-based monomer by using an initiator such as organic halide, a halogenated sulfonyl compound or the like, and a transition metal complex as a catalyst is used as a production method of a (meth)acrylate polymer having a particular functional group, since it has, in addition to the characteristics of the above-mentioned "living radical polymerization method", a halogen and the like comparatively advantageous for the functional group conversion reaction on the terminal and a high degree of freedom in the design of initiator and catalyst. The atom transfer radical polymerization is described in, for example, Matyjaszewski et al., Journal of the American Chemical Society (J. Am. Chem. Soc.) 1995, vol. 117, page 5614 and the like.

Examples of the production method for (meth)acrylate polymer having a reactive silicon group include production methods using a free radical polymerization method using a chain transfer agent, which are disclosed in JP H03-14068 B, JP H04-55444 B, JP H06-211922 A and the like. In addition, the production method using atom transfer radical polymerization is disclosed in JP H09-272714 A and the like, but it is not particularly limited thereto. The above-mentioned (meth)acrylate polymer having a reactive silicon group may be used either singly or two or more kinds thereof may be used in combination.

In one or more embodiments, organic polymers having a reactive silicon group may be used either singly or two or more kinds may be used in combination. Specifically, an organic polymer obtained by blending the polyoxyalkylene-based polymer (A) having a reactive silicon group with a (meth)acrylate polymer having a reactive silicon group can also be used.

The method for producing an organic polymer according to blending of the polyoxyalkylene-based polymer (A) having a reactive silicon group with a (meth)acrylate polymer having a reactive silicon group is proposed in, but is not limited to, JP S59-122541 A, JP S63-112642 A, JP H06-172631 A, JP H11-116763 A and the like. Preferred specific examples thereof include a production method including blending a copolymer having a reactive silicon group, in which the molecular chain is substantially composed of a (meth)acrylate monomer unit having an alkyl group having 1 to 8 carbon atoms represented by the following general formula (6):

(in which $R^8$ is a hydrogen atom or a methyl group and $R^9$ is an alkyl group having 1 to 8 carbon atoms), and a (meth)acrylate monomer unit having an alkyl group having 9 or more carbon atoms represented by the following formula (7):

(in which $R^8$ is as defined above and $R^{10}$ is an alkyl group having 9 or more carbon atoms), with a polyoxyalkylene-based polymer having a reactive silicon group.

In one or more embodiments, $R^9$ in the general formula (6) may include an alkyl group having 1 to 8 carbon atoms, 1 to 4 carbon atoms, or 1 or 2 carbon atoms, such as methyl group, ethyl group, propyl group, n-butyl group, t-butyl group, 2-ethylhexyl group, and the like. Furthermore, the alkyl group for $R^9$ may be one kind or two or more kinds.

In one or more embodiments, $R^{10}$ in the general formula (7) may include a long-chain alkyl group having 9 or more, generally 10 to 30, and preferably 10 to 20 carbon atoms, such as nonyl group, decyl group, lauryl group, tridecyl group, cetyl group, stearyl group, behenyl group and the like. Similarly to $R^9$, the alkyl group for $R^{10}$ may be one kind or two or more kinds.

In one or more embodiments, the molecular chain of the (meth)acrylate polymer is substantially composed of the monomer units of the general formula (6) and the general formula (7). The "substantially" described herein means that the total monomer units of the general formula (6) and the general formula (7) present in the copolymer exceed 50% by weight. The total of the monomer unit of the general formula (6) and the monomer unit of the general formula (7) is preferably 70% by weight or more.

The abundance ratio of the monomer unit of the general formula (6) and the monomer unit of the general formula (7) is preferably 95:5 to 40:60, and more preferably 90:10 to 60:40 in terms of the weight ratio.

In one or more embodiments, the monomer unit other than the monomer unit of the general formula (6) and the monomer unit of the general formula (7), which is optionally contained in the aforementioned copolymer, include acrylic acid such as acrylic acid or methacrylic acid; monomer containing an amide group such as acrylamide, methacrylamide, N-methylol acrylamide, or N-methylol methacrylamide, a monomer containing an epoxy group such as glycidyl acrylate or glycidyl methacrylate, and a monomer containing an amino group such as diethylaminoethyl acrylate, diethylaminoethyl methacrylate, or aminoethyl vinyl ether; and a monomer unit derived from acrylonitrile, styrene, α-methylstyrene, alkyl vinyl ether, vinyl chloride, vinyl acetate, vinyl propionate, ethylene and the like.

As a method for producing an organic polymer obtained by blending with a (meth)acrylate polymer having a reactive silicon functional group, a method of performing polymerization of a (meth)acrylate monomer in the presence of an organic polymer having a reactive silicon group can be utilized. This production method is specifically disclosed in, but is not limited to, each publication of JP S59-78223 A, JP S59-168014 A, JP S60-228516 A, JP S60-228517 A and the like.

Meanwhile, the main chain skeleton of the component (A) may contain, in some embodiments, other components like urethane bond component within a range in which the effect is not greatly impaired.

In one or more embodiments, the urethane bond component may include, but is not particularly limited thereto, a group generated by a reaction between an isocyanate group and an active hydrogen group (hereinbelow, also referred to as an "amide segment").

The amide segment is a group that is represented by the general formula (8):

$$-NR^{11}-C(=O)- \qquad (8)$$

(in which $R^{11}$ is an organic group or a hydrogen atom).

In one or more embodiments the amide segment includes a urethane group formed by a reaction of an isocyanate group and a hydroxy group; a urea group formed by a reaction of an isocyanate group and an amino group; a thiourethane group formed by a reaction of an isocyanate group and a mercapto group and the like. In addition, a group formed by a further reaction of an active hydrogen atom in the urethane group, urea group, and thiourethane group with an isocyanate group is also included in the group of the general formula (8).

As an industrially feasible production method of an organic polymer having an amide segment and a reactive silicon group, in some embodiments, a method for producing an organic polymer according to a method including reacting an excess polyisocyanate compound with an organic polymer having an active hydrogen-containing group on the terminal to obtain a polymer having an isocyanate group on the terminal of a polyurethane-based main chain, and then or simultaneously, reacting the whole or a part of the isocyanate group with W group of the silicon compound represented by the general formula (9):

$$W-R^{12}-SiR^4_{3-a}X_a \qquad (9)$$

(in which $R^4$, X and a are as defined above,
$R^{12}$ is a divalent organic group, and more preferably a hydrocarbon group having 1 to 20 carbon atoms, and
W is an active hydrogen-containing group selected from hydroxy group, carboxy group, mercapto group and amino group (primary or secondary)) can be mentioned.

Examples of a well-known method for producing the organic polymer relating to the above production method include JP S46-12154 B (U.S. Pat. No. 3,632,557), JP S58-109529 A (U.S. Pat. No. 4,374,237), JP S62-13430 A (U.S. Pat. No. 4,645,816), JP H08-53528 A (EP 0676403), JP H10-204144 A (EP 0831108), JP 2003-508561 W (U.S. Pat. No. 6,197,912), JP H06-211879 A (U.S. Pat. No. 5,364,955), JP H10-53637 A (U.S. Pat. No. 5,756,751), JP H11-100427 A, JP 2000-169544 A, JP 2000-169545 A, JP 2002-212415 A, JP 3313360 B, U.S. Pat. Nos. 4,067,844, 3,711,445, JP 2001-323040 A and the like.

Furthermore, a method of producing an organic polymer by reacting an organic polymer having an active hydrogen-containing group on the terminal with a reactive silicon group-containing isocyanate compound represented by the general formula (10):

$$O=C=N-R^{12}-SiR^4_{3-a}X_a \qquad (10)$$

($R^{12}$, $R^4$, X, and a are as defined above) can also be mentioned.

Examples of a well-known method for producing the organic polymer relating to the above production method include JP H11-279249 A (U.S. Pat. No. 5,990,257), JP 2000-119365 A (U.S. Pat. No. 6,046,270), JP S58-29818 A (U.S. Pat. No. 4,345,053), JP H03-47825 A (U.S. Pat. No. 5,068,304), JP H11-60724 A, JP 2002-155145 A, JP 2002-249538 A, WO 03/018658 A, WO 03/059981 A and the like.

In one or more embodiments, the organic polymer may have an active hydrogen-containing group on the terminal such as an oxyalkylene polymer having a hydroxy group on the terminal (polyether polyol), polyacrylic polyol, polyester polyol, a saturated hydrocarbon-based polymer having a hydroxy group on the terminal (polyolefin polyol), polythiol compound, polyamine compound and the like. Of these, polyether polyol, polyacrylic polyol, and polyolefin polyol are preferable since the glass transition temperature of an organic polymer to be obtained is comparatively low, and a cured product to be obtained is superior in cold resistance. Particularly, polyether polyol is particularly preferable since an organic polymer to be obtained shows low viscosity and good workability, and also good depth curability and good adhesiveness. In addition, polyacrylic polyol and saturated hydrocarbon-based polymer are more preferable since a cured product of an organic polymer to be obtained shows good weather resistance and heat resistance.

The polyether polyol can be produced by any production method. Polyether polyol having at least 0.7 hydroxy group per molecular terminal on entire molecule average is preferable. Specific examples thereof include an oxyalkylene polymer produced by using a conventional alkali metal catalyst, an oxyalkylene polymer produced by reacting an initiator such as a polyhydroxy compound having at least two hydroxy groups and the like with alkylene oxide in the presence of a composite metal cyanide complex or cesium, and the like.

Of the above-mentioned polymerization methods, a polymerization method using a composite metal cyanide complex is used in some embodiments since an oxyalkylene polymer having a lower degree of unsaturation, narrow Mw/Mn, lower viscosity, high acid resistance, and high weather resistance can be obtained.

As the aforementioned polyacrylic polyol, a polyol having a (meth)alkyl acrylate (co)polymer as a skeleton, and having a hydroxy group in the molecule can be mentioned. The synthetic method of this polymer is, in some embodiments, a living radical polymerization method such as an atom transfer radical polymerization method, since the molecular weight distribution is narrow and low viscosity can be achieved. In addition, a polymer obtained by continuous bulk polymerization of the alkyl acrylate-based monomer at a high temperature and high pressure as described in JP 2001-207157 A, i.e., based on so-called SGO process, may be used in one or more embodiments. Specifically, ARUFON UH-2000 manufactured by TOAGOSEI CO., LTD. and the like can be mentioned.

In one or more embodiments, the polyisocyanate compound may include aromatic polyisocyanates such as toluene (tolylene) diisocyanate, diphenylmethane diisocyanate, xylylene diisocyanate and the like; aliphatic polyisocyanates such as isophorone diisocyanate, hexamethylene diisocyanate and the like.

The silicon compound of the general formula (9) is not particularly limited. One or more embodiments may include amino group-containing silanes such as γ-aminopropyltrimethoxysilane, N-(β-aminoethyl)-γ-aminopropyltrimethoxysilane, (N-phenyl)-γ-aminopropyltrimethoxysilane, N-ethylaminoisobutyltrimethoxysilane, N-cyclohexylaminomethyltriethoxysilane, N-cyclohexylaminomethyldiethoxymethylsilane, N-phenylaminomethyltrimethoxysilane and the like; hydroxy group-containing silanes such as γ-hydroxypropyltrimethoxysilane and the like; mercapto group-containing silanes such as γ-mercaptopropyltrimethoxysilane and the like; and the like. Furthermore, as described in JP H06-211879 A (U.S. Pat. No. 5,364,955), JP H10-53637 A (U.S. Pat. No. 5,756,751), JP H10-204144 A (EP 0831108), JP 2000-169544 A, and JP 2000-169545 A, a Michael addition reaction product of various α,β-unsaturated carbonyl compounds and a primary amino group-containing silane, and a Michael addition reaction product of various methacryloyl group-containing silanes and a primary amino group-containing compound can also be used as a silicon compound represented by the general formula (9).

The reactive silicon group-containing isocyanate compound represented by the general formula (10) is not particularly limited. One or more embodiments may include γ-trimethoxysilylpropylisocyanate, γ-triethoxysilylpropylisocyanate, γ-methyldimethoxysilylpropylisocyanate, γ-methyldiethoxysilylpropylisocyanate, trimethoxysilylmethylisocyanate, triethoxymethylsilylmethylisocyanate, dimethoxymethylsilylmethylisocyanate, diethoxymethylsilylmethylisocyanate and the like. Furthermore, as described in JP 2000-119365 A (U.S. Pat. No. 6,046,270), a compound obtained by reacting a silicon compound of the general formula (9) with an excess amount of a polyisocyanate compound can also be used as a reactive silicon group-containing isocyanate compound represented by the general formula (10).

One or more embodiments the organic polymer obtained by the above method has, in a main chain skeleton, a group represented by the general formula (11):

$$-NR^{13}-C(=O)-\quad\quad (11)$$

(in which $R^{13}$ is a hydrogen atom or a substituted or unsubstituted organic group). Since the above structure has a relatively high polarity, it tends to have high strength of a cured product or high adhesion property onto a base.

<Weathering Stabilizer (B)>

In one or more embodiments, the curable composition contains a weathering stabilizer (B) having a long chain unsubstituted hydrocarbon group. The weathering stabilizer (B) is a hindered-amine-based photostabilizer (B1) represented by the formula (1):

[Chem. 5]

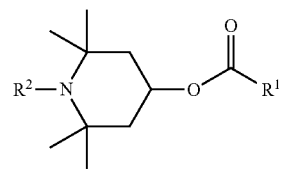

(1)

(in the formula (1), $R^1$ is an unsubstituted hydrocarbon group having 12 to 20 carbon atoms, and $R^2$ is a group selected from hydrogen, methyl group, ethyl group, and alkyloxy group having 1 to 12 carbon atoms)

and/or a hindered-phenol-based antioxidant (B2) represented by the formula (2):

[Chem. 6]

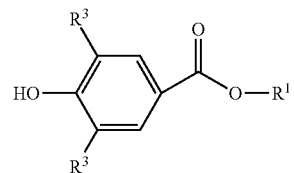

(2)

(in the formula (2), $R^1$ is as defined in the formula (1), two $R^3$ are each independently a group selected from hydrogen, methyl group, ethyl group, and t-butyl group, and at least one of the two $R^3$ is a t-butyl group).

In one or more embodiments, the number of carbon atoms of long chain unsubstituted hydrocarbon group $R^1$ that is contained in the hindered-amine-based photostabilizer (B1) and the hindered-phenol-based antioxidant (B2) is 12 to 20, or 14 to 18. When the number of carbon atom(s) is less than 12, compatibility with the component (A) is lowered so that the effect of enhancing the weather resistance is deteriorated. On the other hand, when the number of carbon atoms is more than 20, higher melting point is yielded so that the weathering stabilizer (B) can be easily precipitated from the curable composition of one or more embodiments of the present invention. The hydrocarbon group as $R^1$ may be either saturated or unsaturated. Number of the unsaturated group is, on average, preferably 2 or less in the hydrocarbon group, and an alkyl group having no unsaturated group is preferable. Furthermore, the hydrocarbon group may be either linear or branched, but a linear hydrocarbon group is preferable from the viewpoint of the compatibility with the component (A).

The hindered-amine-based photostabilizer (B1) is a compound which has a piperidinyl group and a long chain unsubstituted hydrocarbon group in the molecule. The piperidinyl group of hindered structure can enhance the weather resistance, and the long chain unsubstituted hydrocarbon group can enhance the compatibility with the component (A). Namely, it is believed that in some embodiments the curable composition containing the polyoxyalkylene-based polymer (A), the compatibility of the hindered-amine-based photostabilizer (B1) with the curable composition is enhanced by the long chain unsubstituted hydrocarbon group, and as a result, the effect of enhancing the weather resistance of curable composition by the hindered-amine-based photostabilizer (B1), which is caused by the piperidinyl group of hindered structure, is further enhanced. In some embodiments, the number of carbon atoms of long chain unsubstituted hydrocarbon group $R^1$ that is contained in the hindered-amine-based photostabilizer (B1) is 12 to 20, or 14 to 18. When the number of carbon atom(s) is less than 12, compatibility with the component (A) is lowered in some embodiments so that the effect of enhancing the weather resistance is deteriorated. On the other hand, in other embodiments, when the number of carbon atoms is more than 20, higher melting point of the hindered-amine-based photostabilizer (B1) is yielded so that it can be easily precipitated from the curable composition. The unsubstituted hydrocarbon group may be either saturated or unsaturated. Number of the unsaturated group is, on average, preferably 2 or less in the hydrocarbon group, and an alkyl group having no unsaturated group is preferable. Furthermore, the unsubstituted hydrocarbon group may be either linear or branched, but a linear unsubstituted hydrocarbon group is preferable from the viewpoint of the compatibility with the component (A). $R^2$ is preferably hydrogen or a methyl group, but hydrogen is preferable in particular since the effect is exhibited early.

In one or more embodiments, the molecular weight of the hindered-amine-based photostabilizer (B1) is within a range of 300 to 600, or within a range of 400 to 500 from the viewpoint of the compatibility with the component (A). In some embodiments, the melting point of the hindered-amine-based photostabilizer (B1) is 0 to 100° C. from the viewpoint of having good usability of the curable composition, and in some embodiments it is 20 to 80° C. Of the hindered-amine-based photostabilizer (B1), the compound represented by the following formula (12) is commercially available and can be easily obtained. Specifically, it is commercially available from SONGWON with product name of Sabostab UV91, and also from Cytec with product name of Cyasorb UV-3853.

[Chem. 7]

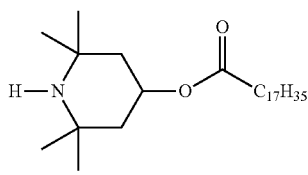

(12)

The hindered-phenol-based antioxidant (B2) is a compound which has a hindered-phenol structure and a long chain unsubstituted hydrocarbon group in the molecule. Although it is widely known that the hindered-phenol structure has an antioxidation property, by having a long chain unsubstituted hydrocarbon group in the molecule, the effect is particularly exhibited with it is added to the component (A). It is believed that in some embodiments, the curable composition containing the polyoxyalkylene-based polymer (A), the compatibility of the hindered-phenol-based antioxidant (B2) with the curable composition is enhanced by the long chain unsubstituted hydrocarbon group, and as a result, the effect of enhancing the weather resistance of curable composition by the hindered-phenol-based antioxidant (B1) that is caused by the hindered-phenol structure is further enhanced. The number of carbon atoms of long chain unsubstituted hydrocarbon group $R^1$ that is contained in the (B2) is preferably 12 to 20, and preferably 14 to 18. If the number of carbon atom(s) is less than 12, compatibility with the component (A) is lowered so that the effect of enhancing the weather resistance is deteriorated. On the other hand, if the number of carbon atoms is more than 20, higher melting point of the hindered-phenol-based antioxidant (B2) is yielded so that it can be easily precipitated from the curable composition of one or more embodiments of the present invention. The unsubstituted hydrocarbon group may be either saturated or unsaturated. Number of the unsaturated group is, on average, preferably 2 or less in the hydrocarbon group, and an alkyl group having no unsaturated group is preferable. Furthermore, the unsubstituted hydrocarbon group may be either linear or branched, but a linear unsubstituted hydrocarbon group is preferable from the viewpoint of the compatibility with the component (A).

Each of the two $R^3$ contained in the hindered-phenol-based antioxidant (B2) is independently any one of hydrogen, a methyl group, an ethyl group, and a t-butyl group. At least one of the two $R^3$ is a t-butyl group. From the viewpoint of having a high antioxidation property, both of the two $R^3$ are preferably a t-butyl group.

In one or more embodiments, the molecular weight of the hindered-phenol-based antioxidant (B2) is within a range of 300 to 600, and in other embodiments it is within a range of 400 to 500 from the viewpoint of the compatibility with the component (A). In some embodiments, the melting point of the hindered-phenol-based antioxidant (B2) is between 0 to 100° C. from the viewpoint of having good usability of the curable composition, and in other embodiments it is between 20 to 80° C.

Of the hindered-phenol-based antioxidant (B2), the compound represented by the following formula (13) is preferable as it is commercially available and can be easily obtained. Specifically, it is commercially available from SONGWON with product name of Songsorb 2908, and also from Cytec with product name of Cyasorb UV-2908 and from Chemipro Kasei Kaisha, Ltd. with product name of KEMISORB 114.

[Chem. 8]

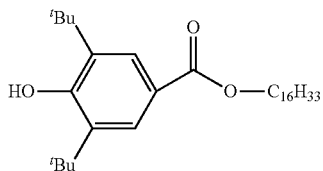

(13)

In one or more embodiments the component (B) is a component that is effective for enhancing the weather resistance or heat resistance of the component (A). It is assumed that, due to the presence of a long chain unsubstituted hydrocarbon group, in particular, the compatibility with a polyoxyalkylene skeleton of the component (A) increases and the effect of hardly having any extraction even when sprayed with water can be maintained for a long period of time.

The component (B) may be used, in some embodiments, either singly or in combination of two or more types thereof. The blending amount of the component (B) is, relative to 100 parts by weight of the polyoxyalkylene-based polymer (A), 0.1 to 20 parts by weight, preferably 0.2 to 10 parts by weight, and particularly preferably 0.3 to 5 parts by weight. When the blending amount of the component (B) is less than 0.1 parts by weight, sufficient weather resistance or heat resistance is not obtained, and thus not desirable. On the other hand, even when the blending amount of the component (B) is higher than 20 parts by weight, the weather resistance is not improved any more, and also the component (B) tends to easily precipitate from a cured product, and thus not desirable.

<Other Antioxidants>

In the curable composition, an antioxidant (i.e., antiaging agent) other than the hindered-phenol-based antioxidant (B2) can be used. By using an antioxidant other than the hindered-phenol-based antioxidant (B2), the heat resistance of a cured product can be enhanced. Examples of the antioxidant include hindered-phenol based, monophenol based, bisphenol based, and polyphenol based, but the hindered-phenol based is preferable. Similarly, the hindered-amine-based photostabilizer represented by Tinuvin 622LD, Tinuvin 144, CHIMASSORB 944LD, and CHIMASSORB 119FL (all manufactured by BASF); MARK LA-57, MARK LA-62, MARK LA-67, MARK LA-63, and MARK LA-68 (all manufactured by ADEKA Corporation); Sanol LS-770, Sanol LS-765, Sanol LS-292, Sanol LS-2626, Sanol LS-1114, Sanol LS-744 (all manufactured by SANKYO CO., LTD.) can also be used. Specific examples of the antioxidant are also described in JP H04-283259 A or JP H09-194731 A. The use amount of the antioxidant is, relative to 100 parts by weight of the polyoxyalkylene-based polymer (A), preferably within a range of 0.1 to 10 parts by weight, and more preferably within a range of 0.2 to 5 parts by weight.

<Other Photostabilizers>

In the curable composition, a photostabilizer other than the hindered-amine-based photostabilizer (B1) can be used. When a photostabilizer other than the hindered-amine-based photostabilizer (B1) is used, the deterioration of a cured product that is caused by photooxidation can be prevented. Examples of the photostabilizer include benzotriazole-based, hindered-amine-based, and benzoate-based compounds, but the hindered-amine-based is particularly preferable. Use amount of the photostabilizer is preferably in the range of 0.1 to 10 parts by weight, and more preferably 0.2 to 5 parts by weight relative to 100 parts by weight of the polyoxyalkylene-based polymer (A). Specific examples of the photostabilizers are also described in JP H09-194731 A.

When a photocurable substance is also used in combination in the curable composition, in particular, when an unsaturated acrylic compound is used, a tertiary amine-containing hindered-amine-based photostabilizer is preferably used as the hindered-amine-based photostabilizer as described in JP H05-70531 A to improve the storage stability of the curable composition. Examples of the tertiary amine-containing hindered-amine-based photostabilizer include Tinuvin 622 LD, Tinuvin 144, and CHIMASSORB 119FL (all manufactured by BASF); MARK LA-57, LA-62, LA-67, and LA-63 (all manufactured by ADEKA Corporation); Sanol LS-765, LS-292, LS-2626, LS-1114, and LS-744 (all manufactured by BASF) and the like.

<Ultraviolet Absorbing Agent>

In the curable composition, an ultraviolet absorbing agent can be used. If an ultraviolet absorbing agent is used, surface weather resistance of the cured product can be enhanced. Examples of the ultraviolet absorbing agent include benzophenone-based ultraviolet absorbing agent, benzotriazole-based ultraviolet absorbing agent, salycilate-based ultraviolet absorbing agent, substituted tolyl-based ultraviolet absorbing agent and metal chelate-based compound and the like, but benzotriazole-based ultraviolet absorbing agent is particularly preferable. Use amount of the ultraviolet absorbing agent is preferably 0.1 to 10 parts by weight, and more preferably 0.2 to 5 parts by weight relative to 100 parts by weight of the polyoxyalkylene-based polymer (A). A combined use of a phenol-based or hindered-phenol-based antioxidant, a hindered-amine-based photostabilizer, and a benzotriazole-based ultraviolet absorbing agent is preferable.

<Plasticizer>

The curable composition may contain a plasticizer. Examples of the plasticizer include non-aromatic dibasic acid esters such as dioctyl adipate, dioctyl sebacate, dibutyl sebacate, diisodecyl succinate and the like; aliphatic esters butyl oleate, methyl acetylricinolate and the like; phosphates such as tricresyl phosphate, tributyl phosphate and the like; trimellitic acid esters; chlorinated paraffins; hydrocarbon oils such as alkyldiphenyl, partially hydrogenated terphenyl, and the like; processed oils; epoxy plasticizers such as epoxidized soybean oil, benzyl epoxystearate and the like.

Furthermore, phthalates such as dimethyl phthalate, diethyl phthalate, dibutyl phthalate, diisobutyl phthalate, dinormalhexyl phthalate, bis(2-ethylhexyl) phthalate, dinormaloctyl phthalate, diisononyl phthalate, dinonyl phthalate, diisodecyl phthalate, diisoundecyl phthalate, bisbutylbenzyl phthalate and the like can also be used as a plasticizer. However, considering the influence on a human body or environment, use amount thereof is preferably as low as possible, and it is preferable not to use them.

A plasticizer having improved safety according to hydrogenation of a phthalate is also commercially available. As such plasticizer, Hexamoll DINCH (product name) that is commercially available from BASF can be used, for example.

In addition, a polymer plasticizer can be used. When a polymer plasticizer is used, the initial property of a cured product can be maintained for a long period of time as compared to use of a low molecular weight plasticizer which does not contain a polymer component in the molecule. Furthermore, when an alkyd paint is applied to a cured product, the drying property (also referred to as coatability) of the paint can be improved. Specific examples of the polymer plasticizer include, but are not limited to, vinyl polymers obtained by polymerization of vinyl monomers by various methods; polyalkylene glycol esters such as diethylene glycol dibenzoate, triethylene glycol dibenzoate, pentaerythritol ester and the like; polyester plasticizer obtained from dibasic acids such as sebacic acid, adipic acid, azelaic acid, phthalic acid and the like, and divalent alcohols such as ethylene glycol, diethylene glycol, triethylene glycol, propylene glycol, dipropylene glycol and the like; polyethers including polyether polyol such as polyethylene glycol, polypropylene glycol, polytetramethylene glycol and the like having a molecular weight of 500 or more, and preferably 1000 or more, or derivatives of polyether polyols in which hydroxy group of those polyether polyols is converted to an ester group, an ether group and the like; polystyrenes such as polystyrene, poly-α-methylstyrene and the like; polybutadiene, polybutene, polyisobutylene, butadiene-acrylonitrile copolymer, polychloroprene and the like.

Of those polymer plasticizers, one having compatibility with the polymer of the component (A) is preferable. In view thereof, polyethers or vinyl polymers are preferable. In addition, use of polyethers as a plasticizer is preferable since surface curability and depth curability are improved, and curing retardation after storage does not occur. Of these, polypropylene glycol is more preferable. From the viewpoint of compatibility, weather resistance, and heat resistance, vinyl polymers are preferable. Of the vinyl polymers, acrylic polymers and/or (meth)acrylate polymers are preferable, and acrylate polymers such as poly(alkyl acrylate) and the like are more preferable. The synthetic method of the polymer is preferably a living radical polymerization method, more preferably an atom transfer radical polymerization, since the molecular weight distribution is narrow, and low viscosity can be achieved. In addition, a polymer obtained by continuous bulk polymerization of the alkyl acrylate-based monomer at a high temperature and high pressure as described in JP 2001-207157 A, i.e., so-called SGO process, is preferably used.

The number average molecular weight of the polymer plasticizer is preferably 500 to 15000, more preferably 800 to 10000, even more preferably 1000 to 8000, particularly preferably 1000 to 5000, and most preferably 1000 to 3000. If the molecular weight is too low, the polymer plasticizer flows out over time due to heat or rainfall, the initial properties of the cured product cannot be maintained over a long period of time, and alkyl coatability cannot be improved. If the molecular weight is too high, the viscosity becomes high, and the workability is degraded. While the molecular weight distribution of the polymer plasticizer is not particularly limited, it is preferably as narrow as possible, and less than 1.80 is preferable, not more than 1.70 is more preferable, not more than 1.60 is still more preferable, not more than 1.50 is further preferable, not more than 1.40 is particularly preferable, and not more than 1.30 is most preferable.

The number average molecular weight is measured by GPC method in the case of a vinyl polymer, and by terminal group analysis in the case of a polyether-based polymer. Furthermore, the molecular weight distribution (Mw/Mn) is measured by GPC method (based on polystyrene as reference).

It is acceptable that the polymer plasticizer does not have a reactive silicon group, but it may have a reactive silicon group. When a reactive silicon group is present, it acts as a reactive plasticizer, and prevents transfer of plasticizer from the cured product. When the polymer plasticizer has a reactive silicon group, the number of reactive silicon group per 1 molecule is preferably not more than 1, and more preferably not more than 0.8 on average. When a plasticizer having a reactive silicon group, particularly an oxyalkylene polymer having a reactive silicon group, is used, the number average molecular weight thereof needs to be lower than that of the polymer of component (A).

The plasticizer may be used either singly or two or more kinds thereof may be used in combination. Furthermore, a low molecular weight plasticizer and a polymer plasticizer may be used in combination. These plasticizers can also be blended during production of the polymer.

Use amount of the plasticizer is 5 to 150 parts by weight, preferably 10 to 120 parts by weight, and even more preferably 20 to 100 parts by weight relative to 100 parts by weight of the polymer of component (A). When the amount is less than 5 parts by weight, the effect of the plasticizer is not exhibited, and when it exceeds 150 parts by weight, the mechanical strength of the cured product becomes insufficient.

<Thermally Expandable Microparticle Hollow Material>

The thermally expandable microparticle hollow material described in JP 2004-51701 A, JP 2004-66749 A and the like can also be contained in the curable composition. The thermally expandable microparticle hollow material is a plastic sphere obtained by covering a low boiling point compound such as hydrocarbon having 1 to 5 carbon atoms and the like with an outer shell polymer material (vinylidene chloride copolymer, acrylonitrile-based copolymer, or vinylidene chloride-acrylonitrile copolymer) into a sphere. When an adhesion part formed using the composition is heated, the gas pressure in the outer shell of the thermally expandable microparticle hollow material increases, and the outer shell polymer material is softened to dramatically increase the volume, and thus playing a role of detaching an adhesive interface. According to addition of the thermally expandable microparticle hollow material, it is possible to obtain an adhesive composition that can be simply detached only by heating without disrupting the materials when it is not necessary, and also can be detached by heating without using any organic solvent at all.

<Amino Group-Containing Silane Coupling Agent (C)>

The curable composition may contain an amino group-containing silane coupling agent (i.e., aminosilane) (C). Aminosilane is a compound having a reactive silicon group and an amino group in the molecule, and is generally referred to as an adhesiveness imparting agent. By using it for various adherends, for example, inorganic substrates such as glass, aluminum, stainless, zinc, copper, mortar and the like, organic substrates such as vinyl chloride, acrylic, polyester, polyethylene, polypropylene, polycarbonate and the like, a remarkable adhesiveness-improving effect under nonprimer conditions or primer treatment conditions can be exhibited. When used under nonprimer conditions, particularly, an adhesiveness-improving effect on various adherends is remarkable. In addition, aminosilane is a compound capable of functioning as a physical property adjusting agent, an inorganic filler dispersion property-improving agent and the like.

As a specific example of the reactive silicon group of aminosilane, groups already exemplified above can be mentioned. However, a methoxy group, an ethoxy group and the like are preferable from the viewpoint of the hydrolysis rate. The number of hydrolyzable groups is preferably two or more, particularly 3 or more. Specific examples of the aminosilane include amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, N,N'-bis[3-(trimethoxysilyl)propyl]ethylenediamine and the like;

ketimine type silanes such as N-(1,3-dimethylbutylidene)-3-(triethoxysilyl)-1-propaneamine.

To secure good adhesiveness, γ-aminopropyltrimethoxysilane, γ-(2-aminoethyl)aminopropyltrimethoxysilane, and γ-(2-aminoethyl)aminopropylmethyldimethoxysilane are preferable among them. Only one kind of aminosilane as the component (C) may be used, or two or more kinds thereof may be used in combination. It is indicated that γ-(2-aminoethyl)aminopropyltrimethoxysilane has a stimulation property when compared to other aminosilanes. The stimulation property can be mitigated by using in combination γ-aminopropyltrimethoxysilane instead of reducing the amount of the aminosilane.

The blending amount of the amino group-containing silane coupling agent (C) is preferably 0.1 to 20 parts by weight or so, and more preferably 2 to 10 parts by weight relative to 100 parts by weight of the polyoxyalkylene-based polymer (A). If the blending amount of the amino group-containing silane coupling agent (C) is less than 1 part by weight, the cured product may fail to show sufficient adhesiveness. On the other hand, when the blending amount of the amino group-containing silane coupling agent (C) exceeds 20 parts by weight, the cured product becomes brittle, cannot afford sufficient strength, and the curing rate of the curable composition may become slow.

<Adhesiveness Imparting Agent>

An adhesiveness imparting agent other than the amino group-containing silane coupling agent (C) may be contained in the curable composition. Specific examples of the adhesiveness imparting agent other than the amino group-containing silane coupling agent (C) include epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, or β-(3,4-epoxycyclohexyl)ethyltriethoxysilane and the like; isocyanate group-containing silanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, (isocyanatomethyl)trimethoxysilane, (isocyanatomethyl)dimethoxymethylsilane and the like; mercapto group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltriethoxysilane and the like; carboxysilanes such as β-carboxyethyltriethoxysilane, β-carboxyethylphenylbis(2-methoxyethoxy)silane, N-β-(carboxymethyl) aminoethyl-γ-aminopropyltrimethoxysilane and the like; vinyl type unsaturated group-containing silanes such as vinyltrimethoxysilane, vinyltriethoxysilane, γ-methacryloyloxypropylmethyldimethoxysilane, γ-acryloyloxypropylmethyltriethoxysilane and the like; halogen-containing silanes such as γ-chloropropyltrimethoxysilane and the like; isocyanurate silanes such as tris(trimethoxysilyl)isocyanurate and the like, and the like. Furthermore, a condensation product obtained by partial condensation of the above-mentioned silanes can also be used. Furthermore, amino-modified silyl polymer, silylated amino polymer, unsaturated aminosilane complex, phenylamino long-chain alkylsilane, aminosilylated silicone, silylated polyester and the like, which are derivatives obtained by modification of them can be used as a silane coupling agent. The silane coupling agent is used within a range of 0.1 to 20 parts by weight relative to 100 parts by weight of the polyoxyalkylene-based polymer (A). It is particularly preferably used within a range of 0.5 to 10 parts by weight. Use of the silane coupling agent in the curable composition allows exhibition of a significant adhesiveness-improving effect under nonprimer conditions or primer treatment conditions when inorganic adherends such as glass, aluminum, stainless, zinc, copper, mortar and the like, or organic adherends such as vinyl chloride, acrylic, polyester, polyethylene, polypropylene, polycarbonate and the like are used. When use is made under nonprimer conditions, an adhesiveness-improving effect on various adherends is remarkable, in particular. Specific examples other than silane coupling agent include, although not particularly limited thereto, an epoxy resin, a phenol resin, sulfur, alkyl titanates, and aromatic polyisocyanate. Only one kind of the above-mentioned adhesiveness imparting agents may be used, or two or more kinds thereof may be used in combination. According to addition of those adhesiveness imparting agents, the adhesiveness for an adherend can be improved.

Among them, to secure good adhesiveness, γ-glycidoxypropyltrimethoxysilane, γ-glycidoxypropyltriethoxysilane, and γ-glycidoxypropylmethyldimethoxysilane are preferable.

Use amount of the adhesiveness imparting agent is preferably 0.01 to 20 parts by weight or so, more preferably 0.1 to 10 parts by weight or so, and particularly preferably 1 to 7 parts by weight or so relative to 100 parts by weight of the polyoxyalkylene-based polymer (A). When the blending amount of the adhesiveness imparting agent is lower than the above range, there is a case in which the adhesiveness is not obtained at sufficient level. On the other hand, when the blending amount of the adhesiveness imparting agent exceeds the above range, there may be a case in which practically useful depth curability is not obtained.

As for the adhesiveness imparting agent, an epoxy resin, a phenol resin, sulfur, alkyl titanates, aromatic polyisocyanates or the like can also be used other than the adhesiveness imparting agents that are described above. The adhesiveness imparting agent may be used either singly or as a mixture of two or more types thereof. However, depending on addition amount, the epoxy resin may lower the catalyst activity. Due to such reasons, the addition amount of the epoxy resin is preferably as small as possible in the curable composition. The use amount of the epoxy resin is preferably 5 parts by weight or less, and more preferably 0.5 parts by weight or less relative to 100 parts by weight of the polyoxyalkylene-based polymer (A), and it is particularly preferable that the epoxy resin is substantially not contained.

<Curing Catalyst>

The curable composition preferably contains a curing catalyst, which is a catalyst for promoting condensation of the reactive silicon group contained in the polyoxyalkylene-based polymer (A). Specific examples of the curing catalyst include, but are not limited to, the followings: titanium compounds such as tetrabutyl titanate, tetrapropyl titanate, titanium tetrakis(acetylacetonate), bis(acetylacetonate)diisopropoxy titanium, diisopropoxy titanium bis(ethylacetoacetate) and the like; tetravalent organotin compounds such as dimethyl tin diacetate, dimethyl tin bis(acetylacetonate), dibutyl tin dilaurate, dibutyl tin maleate, dibutyl tin phthalate, dibutyl tin dioctanoate, dibutyl tin bis(2-ethylhexanoate), dibutyl tin bis(methylmaleate), dibutyl tin bis(ethylmaleate), dibutyl tin bis(butylmaleate), dibutyl tin bis(octylmaleate), dibutyl tin bis(tridecylmaleate), dibutyl tin bis(benzylmaleate), dibutyl tin diacetate, dioctyl tin bis(ethylmaleimide), dioctyl tin bis(octylmaleate), dibutyl tin dimethoxide, dibutyl tin bis(nonylphenoxide), dibutenyl tin oxide, dibutyl tin oxide, dibutyl tin bis(acetylacetonate), dibutyl tin bis(ethylacetoacetate), a reaction product of dibutyl tin oxide and silicate compound, a reaction product of dibutyl tin oxide and phthalate, dioctyl tin dilaurate, dioctyl tin diacetate, dioctyl tin bis(acetylacetonate), and the like; organoaluminum compounds such as aluminum tris (acetylacetonate), aluminum tris(ethylacetoacetate), diisopropoxy aluminum ethylacetoacetate and the like; and zirconium compounds such as zirconium tetrakis (acetylacetonate) and the like. Carboxylic acid and/or metal salt of carboxylic acid can also be used as a curing catalyst. Amidine compounds described in WO 2008/078654 A can also be used. Examples of the amidine compound include 1-(o-tolyl)biguanide, 1-phenylguanidine, 1,2-dimethyl-1,4,5,6-tetrahydropyrimidine, 1,5,7-triazabicyclo[4.4.0]deca-5-en, and 7-methyl-1,5,7-triazabicyclo[4.4.0]deca-5-en, but not limited thereto.

Among the curing catalysts that are mentioned in the above, a dibutyl tin-based curing catalyst has good balance of curability, adhesiveness and the like, and most universally used. In recent years, however, the dibutyl tin-based curing catalyst is feared to show an adverse influence on the human body and, in such case, a dioctyl tin-based curing catalyst can be used. As the dioctyl tin-based curing catalyst, dioctyl tin bis(acetylacetonate), dioctyl tin dilaurate, dioctyl tin diversatate, and a reaction product of dioctyl tin salt and ethyl silicate are industrially available, and thus preferable.

Furthermore, there is also a case in which even the dioctyl tin-based curing catalyst is not welcomed to be used for electric and electronic applications, and for those cases, a metal other than tin or a strong base curing catalyst is preferable. In particular, bismuth, zinc, aluminum, titanium or the like are preferable. From the viewpoint of high catalyst activity and favorable adhesiveness, 1-(o-tolyl) biguanide and 1-phenylguanidine are preferable as a strong base curing catalyst. When it is desired to have practically meaningful curing rate and a transparent cured product which hardly undergoes any coloration, dibutyl tin dilaurate, a product of dibutyl tin oxide and phthalic acid ester, and tin octylate, or the like are preferable.

Blending amount of the curing catalyst is preferably 0.01 to 20 parts by weight, and more preferably 0.1 to 10 parts by weight relative to 100 parts by weight of the polyoxyalkylene-based polymer (A). As the blending amount of the curing catalyst is within this range, the curable composition has an excellent curing property, and also by having suitable curing time, and thus it can have excellent workability.

<Silica (D)>

The curable composition preferably contains silica (D). Examples of the silica (D) include fumed silica, precipitating silica, crystal silica, molten silica, dolomite, silicic anhydride, and hydrous silicate. When such silicas are used, it is easy to obtain a transparent curable composition and cured product. By using the silica, a cured product which has the haze value of 10% or less, or 5% or less for a cured product with thickness of 1 mm can be obtained. Furthermore, as it also has an effect of imparting a thixotropic property, it is also suitable for preventing sagging of the curable composition.

Blending amount of the silica (D) is preferably 0.1 to 20 parts by weight, and more preferably 3 to 10 parts by weight relative to 100 parts by weight of the polyoxyalkylene-based polymer (A). As the blending amount of the silica is within this range, the curable composition has an excellent thixotropic property or strength, and, in the case of a transparent curable composition, suitable transparency can be exhibited.

<Filler Other than Silica>

The curable composition may contain a filler other than the silica (D), within a range in which the transparency is not impaired. Examples of the filler include a filler including glass micro balloon, organic micro balloon made from phenol resin or vinylidene chloride resin, resin powder such as PVC powder, PMMA powder and the like; and a fibrous filler such as glass filler and filament. When a filler is used, the use amount thereof is preferably 1 to 250 parts by weight, and more preferably 10 to 200 parts by weight relative to 100 parts by weight of the polymer of component (A). They are effective for a case in which higher strength is mainly desired.

<Silicate>

The curable composition may contain silicate. The silicate acts as a crosslinking agent and has a function to improve recovery property, durability, and creep resistance of the polyoxyalkylene-based polymer (A). Furthermore, the silicate also has an effect to improve the adhesiveness and water-resistant adhesiveness, as well as adhesion durability under high temperature and high humidity conditions. As silicate, tetraalkoxysilane or a partially hydrolyzed condensate thereof can be used. When silicate is used, the use amount is preferably 0.1 to 20 parts by weight, and more preferably 0.5 to 10 parts by weight relative to 100 parts by weight of the polyoxyalkylene-based polymer (A).

Specific examples of the silicate include tetraalkoxysilanes (tetraalkylsilicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane, tetra-t-butoxysilane and the like, and a partially hydrolyzed condensate thereof.

The partially hydrolyzed condensate of tetraalkoxysilane is preferable since it shows a greater improvement effect on the recovery property, durability and creep resistance of the polyoxyalkylene-based polymer (A) than with tetraalkoxysilane.

As the partially hydrolyzed condensate of tetraalkoxysilane, for example, one obtained by adding water to tetraalkoxysilane to allow partial hydrolysis and then condensation thereof by a conventional method can be mentioned. In addition, as the partially hydrolyzed condensate of organosilicate compound, a commercially available product can be used. As such condensates, for example, Methyl Silicate 51 and Ethyl Silicate 40 (both manufactured by COLCOAT CO., LTD.) and the like can be mentioned.

<Tackiness Imparting Agent>

The curable composition may contain a tackiness imparting agent. While the tackiness imparting resin is not particularly limited, one generally used irrespective of being solid or liquid at ambient temperature can be used. Specific examples of the tackiness imparting agent include a styrene-based block copolymer and a hydrogenated product thereof, a phenol resin, a modified phenol resin (e.g., cashew oil-modified phenol resin, tall oil-modified phenol resin etc.), a terpene phenol resin, a xylene-phenol resin, a cyclopentadiene-phenol resin, a coumarone indene resin, a rosin resin, a rosin ester resin, a hydrogenated rosin ester resin, a xylene resin, a low molecular weight polystyrene-based resin, a styrene copolymer resin, a petroleum resin (e.g., C5 hydrocarbon resin, C9 hydrocarbon resin, C5C9 hydrocarbon copolymerized resin etc.), a hydrogenated petroleum resin, a terpene-based resin, DCPD resin petroleum resin, and the like. They may be used either singly or two or more kinds thereof may be used in combination. Examples of the styrene-based block copolymer and the hydrogenated product thereof include a styrene-butadiene-styrene block copolymer (SBS), a styrene-isoprene-styrene block copolymer (SIS), a styrene-ethylene butylene-styrene block copolymer (SEBS), a styrene-ethylene propylene-styrene block copolymer (SEPS), a styrene-isobutylene-styrene block copolymer (SIBS), and the like. The above-mentioned tackiness imparting resin may be used either singly or two or more kinds thereof may be used in combination.

Use amount of the tackiness imparting agent is preferably within a range of 5 to 1,000 parts by weight, and more preferably 10 to 100 parts by weight relative to 100 parts by weight of the polyoxyalkylene-based polymer (A).

<Physical Property Adjusting Agent>

The curable composition may contain, if necessary, a physical property adjusting agent for adjusting the tensile property of a cured product to be generated. Examples of the physical property adjusting agent include, but are not particularly limited thereto, alkylalkoxysilanes such as methyltrimethoxysilane, dimethyldimethoxysilane, trimethylmethoxysilane, n-propyltrimethoxysilane and the like; alkoxysilanes having a functional group such as alkylisopropenoxysilanes such as dimethyldiisopropenoxysilane, methyltriisopropenoxysilane, γ-glycidoxypropylmethyldiisopropenoxysilane and the like, γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, γ-mercaptopropylmethyldimethoxysilane and the like; silicone varnishs; polysiloxanes and the like. By using the physical property adjusting agent, the hardness resulting from curing of the curable composition can be either increased or decreased, and elongation at break can be exhibited. The physical property adjusting agent may be used either singly or two or more kinds thereof may be used in combination.

Particularly, a compound that produces a compound having a monovalent silanol group by hydrolysis has an activity of lowering the modulus of a cured product without worsening the stickiness of the surface of the cured product. Particularly, a compound that produces trimethylsilanol is preferable. As the compound that produces a compound having a monovalent silanol group by hydrolysis, the compound described in JP H05-117521 A can be mentioned. In addition, as the compound that produces the silicon compound, for example, a derivative of alkyl alcohol such as hexanol, octanol, decanol and the like, which produces $R_3SiOH$ like trimethylsilanol by hydrolysis; and a derivative of polyvalent alcohol having 3 or more hydroxy groups such as trimethylolpropane, glycerin, pentaerythritol, sorbitol and the like, which produces $R_3SiOH$ like trimethylsilanol by hydrolysis and is described in JP H11-241029 A can be mentioned.

In addition, as the compound that produces the silicon compound, a derivative of an oxypropylene polymer, which produces $R_3SiOH$ like trimethylsilanol by hydrolysis and is described in JP H07-258534 A can also be mentioned. Furthermore, a polymer having a crosslinkable reactive silicon-containing group and a silicon-containing group that can become a compound containing monosilanol by hydrolysis and is described in JP H06-279693 A can also be used.

The physical property adjusting agent is used within a range of preferably 0.1 to 20 parts by weight, and more preferably 0.5 to 10 parts by weight relative to 100 parts by weight of the organic polymer (A) having a reactive silicon group.

<Thixotropy Imparting Agent>

A thixotropy imparting agent (antisagging agent) may be added to the curable composition, if necessary, to prevent sagging and improve workability. Examples of the thixotropy imparting agent include, but are not particularly limited, polyamide waxes; hydrogenated castor oil derivatives; metal soaps such as calcium stearate, aluminum stearate, barium stearate and the like. When a rubber powder having a particle size of 10 to 500 μm described in JP H11-349916 A or an organic fiber described in JP 2003-155389 A is used as a thixotropy imparting agent, a curable composition showing high thixotropy and good workability can be obtained. Such thixotropy imparting agents (i.e., antisagging agent) may be used either singly or two or more kinds thereof may be used in combination. When a thixotropy imparting agent is used, the amount thereof is preferably 0.1 to 20 parts by weight relative to 100 parts by weight of the polyoxyalkylene-based polymer (A).

<Compound Having Epoxy Group>

In the curable composition, a compound having an epoxy group in the molecule may be contained. By the use of the compound having an epoxy group, the recovery property of the cured product can be increased. As the compound having an epoxy group, epoxidized unsaturated fats and oils, epoxidized unsaturated fatty acid esters, alicyclic epoxy compounds, epichlorohydrin derivative and mixtures thereof and the like can be mentioned as an example. Specifically, epoxidized soy bean oil, epoxidized linseed oil, bis(2-ethylhexyl)-4,5-epoxycyclohexane-1,2-dicarboxylate (E-PS), epoxyoctyl stearate, epoxybutyl stearate and the like can be mentioned. Of these, E-PS is particularly preferable. The compound having an epoxy group is used within a range of preferably 0.5 to 50 parts by weight relative to 100 parts by weight of the polyoxyalkylene-based polymer (A).

<Photocurable Substance>

The curable composition may also contain a photocurable substance. When a photocurable substance is used, a film of the photocurable substance is formed on the surface of a cured product, and thus the stickiness or weather resistance of a cured product can be improved. The photocurable substance creates a change in physical properties like curing by causing a chemical change in the molecular structure within a relative short time by the action of light. As the photocurable substance of this type, various ones like an organic monomer, an oligomer, a resin, a composition containing same are known, and any commercially available product thereof can be used. As a representative example, an unsaturated acrylic compound, polyvinyl cinnamate, an azidated resin and the like can be used. Examples of the unsaturated acrylic compound include monomers, oligomers, and a mixture thereof, having one or several acrylic or methacrylic unsaturated groups, and examples thereof include a monomer like propylene (or butylene, ethylene) glycol di(meth)acrylate and neopentyl glycol di(meth)acrylate, and oligoesters having a molecular weight of 10,000 or below. Specific examples thereof include special acrylate (bifunctional) Aronix M-210, Aronix M-215, Aronix M-220, Aronix M-233, Aronix M-240, Aronix M-245; (trifunctional) Aronix M-305, Aronix M-309, Aronix M-310, Aronix M-315, Aronix M-320, Aronix M-325, and (multifunctional) Aronix M-400 and the like. Particularly, a compound containing an acryl functional group is preferable, and a compound containing not less than 3 functional groups on average in one molecule is more preferable. (In the above, all Aronix are a product of TOAGOSEI CO., LTD.)

Polyvinyl cinnamates indicate a photosensitive resin which has a cinnamoyl group as a photosensitive group, and various polyvinyl cinnamate derivatives are exemplified in addition to a compound of polyvinyl alcohol esterified with cinnamic acid. The azidated resin is known as a photosensitive resin which has an azido group as photosensitive group, and, other than rubber photosensitive solution generally added with diazide compound as a photosensitizer, detailed exemplifications are given in "Photosensitive Resin" (published on Mar. 17, 1972 by Insatsu Gakkai Shuppanbu Ltd., from page 93, from page 106, from page 117), and it may be used either singly, or after mixing thereof and, if necessary, with addition of a sensitizer. There is a case in which, as a sensitizer like ketones and nitro compounds and/or a promoter like amines is added, the effect is enhanced. Use amount of the photocurable substance is preferably 0.1 to 20 parts by weight, and more preferably 0.5 to 10 parts by weight relative to 100 parts by weight of the polyoxyalkylene-based polymer (A). When the amount is 0.1 parts by weight or less, there may be a case in which the weather resistance is not enhanced to a desired level. When the amount is 20 parts by weight or more, there may be a case in which the cured product becomes too hard and tends to have an occurrence of a crack.

<Oxygen Curable Substance>

The curable composition may contain an oxygen curable substance. As the oxygen curable substance, an unsaturated compound capable of reacting with oxygen in the air can be mentioned as an example. The oxygen curable substance reacts with oxygen in the air to form a cured film near the surface of the cured product, thereby playing a role of preventing stickiness of the surface and attachment of dirt and dust on the surface of the cured product and the like. Specific examples of the oxygen curable substance include dry oil such as tung oil, linseed oil and the like, various alkyd resins obtained by modifying the compound; acrylate polymer modified by dry oil; epoxy resin; silicon resin; liquid polymers such as 1,2-polybutadiene, 1,4-polybutadiene, C5 to C8 diene polymer and the like obtained by polymerization or copolymerization of diene compounds such as butadiene, chloroprene, isoprene, 1,3-pentadiene and the like; liquid copolymers such as NBR, SBR and the like obtained by copolymerization of those diene compounds and copolymerizable monomers such as acrylonitrile, styrene and the like, such that the diene compound becomes the main component, and also modified products of the above (maleic modified products, boil oil modified products and the like) and the like. They may be used either singly or two or more kinds thereof may be used in combination. Of these, tung oil and liquid diene polymer are preferable. In addition, a combined use of a catalyst promoting the oxidation curing reaction or a metal dryer may enhance the effect. As such catalyst and metal dryer, metal salts such as cobalt naphthenate, lead naphthenate, zirconium naphthenate, cobalt octylate, zirconium octylate and the like, amine compounds and the like can be mentioned as an example. Use amount of the oxygen curable substance is preferably within a range of 0.1 to 20 parts by weight, more preferably 0.5 to 10 parts by weight relative to 100 parts by weight of the polyoxyalkylene-based polymer of content (A). When the aforementioned amount is less than 0.1 parts by weight, it is difficult to obtain the effect of improving a contamination property. When it exceeds 20 parts by weight, the tensile property and the like of the cured product tend to be impaired. As described in JP H03-160053 A, the oxygen curable substance is preferably used in combination with a photocurable substance.

<Flame Retardant>

The curable composition may be added with a flame retardant such as a phosphorus compound such as ammonium polyphosphate, tricresyl phosphate and the like, aluminum hydroxide, magnesium hydroxide, thermally expandable black lead and the like. The flame retardant may be used either singly or two or more kinds thereof may be used in combination. The flame retardant is used preferably at 5 to 200 parts by weight, and more preferably at 10 to 100 parts by weight relative to 100 parts by weight of the polyoxyalkylene-based polymer of content (A).

<Solvent>

In the curable composition, a solvent can be added for the purpose of lowering the viscosity, increasing the thixotropy, and improving the workability of the composition. The solvent is not particularly limited, and various compounds can be used. Specific examples thereof include hydrocarbon solvents such as toluene, xylene, heptane, hexane, petroleum solvent and the like, halogenated solvent such as trichloroethylene and the like, ester solvents such as ethyl acetate, butyl acetate and the like, ketone solvents such as acetone, methyl ethyl ketone, methyl isobutyl ketone and the like, alcohol solvents such as methanol, ethanol, isopropyl alcohol and the like, silicone solvent such as hexamethylcyclotrisiloxane, octamethylcyclotetrasiloxane, decamethylcyclopentasiloxane and the like. These solvents may be used either singly or two or more kinds thereof may be used in combination.

Meanwhile, with regard to the blending amount of a solvent is high, there may be a case in which toxicity to a human body is high, and there may be also a case in which volume shrinkage of a cured product is shown. As such, the blending amount of a solvent is preferably 3 parts by weight or less, and more preferably 1 part by weight or less relative to 100 parts by weight of the polyoxyalkylene-based polymer (A), and it is most preferable that the solvent is substantially not contained.

<Fluorescent Whitening Agent>

To the curable composition, a fluorescent whitening agent may be added, if necessary. By adding a fluorescent whitening agent, yellowing or cloudiness of the cured product can be improved. Examples of the fluorescent whitening agent include stilben-based, benzoxazole-based, coumarine-based, and pyrazoline-based, and the benzoxazole-based is preferable in that it has little yellowing. Specifically, it is commercially available under trade names of TINOPAL OB, Uvitex OB by BASF, and thus can be easily obtained.

Various additives may be added to the curable composition as necessary to adjust various physical properties of a curable composition or a cured product. Examples of such additives include a curability adjusting agent, a radical inhibitor, a metal deactivator, an antiozonant, a phosphorus peroxide decomposer, a lubricant, a pigment, a foaming agent, a repellent for white ants, a fungicide and the like. Only one kind of these various additives may be used, or two or more kinds thereof may be used in combination. Specific examples other than the specific examples of the additives that have been cited in one or more embodiments of the present invention are described in each publication of JP H04-69659 B, JP H07-108928 B, JP S63-254149 A, JP S64-22904 A, JP 2001-72854 A and the like.

It is also possible that the curable composition is prepared as a one-component type in which all blending components are blended, sealed, and stored in advance, and, after application, cured by moisture in the air. Furthermore, it can also be prepared as a two-component type in which components including a separate curing catalyst as a curing agent, a filler, a plasticizer, and water are blended in advance, and the blended material and the polymer composition are admixed with each other before use. From the viewpoint of the workability, the one-component type is preferable. In the case of the one-component type, the moisture content in the curable composition is preferably 2000 ppm or less from the viewpoint of stability.

In a case in which the curable composition is a one-component type, a blending component containing moisture is preferably used after drying by dehydration in advance or dehydrated during blending kneading by depressurization and the like, because all the blending components are blended in advance. In a case in which the curable composition is a two-component type, there is little possibility of having gelation even when a slight amount of moisture is contained in the blending components since the curing catalyst is not required to be blended in a main formulation which contains the polymer having a reactive silicon group. However, when storage stability over a long period of time is necessary, it is preferably dried by dehydration. As for the method for dehydration and drying, in the case of a solid product such as powder and the like, a heat-drying method or a reduced pressure dehydrating method is preferable. In the case of a liquid product, a reduced pressure dehydrating method or a dehydration method using synthetic zeolite, activated alumina, silica gel, calcium oxide, or magnesium oxide is preferable. In addition to those dehydration and drying methods, it is also possible to have dehydration by adding an alkoxysilane compound such as n-propyltrimethoxysilane, vinyltrimethoxysilane, vinylmethyldimethoxysilane, methylsilicate, ethylsilicate, γ-mercaptopropylmethyldimethoxysilane, γ-mercaptopropylmethyldiethoxysilane, or γ-glycidoxypropyltrimethoxysilane followed by a reaction with water. It is also possible that dehydration is carried out by blending an oxazolidine compound such as 3-ethyl-2-methyl-2-(3-methylbutyl)-1,3-oxazolidine followed by a reaction with water. Furthermore, it is also possible that a small amount of an isocyanate compound is blended followed by a reaction of the isocyanate group with water to have dehydration. According to addition of an alkoxysilane compound, an oxazolidine compound, and an isocyanate compound, the storage stability is enhanced.

Use amount of a dehydrating agent, in particular, a silicon compound capable of reacting with water like vinyltrimethoxysilane is preferably within a range of 0.1 to 20 parts by weight, and more preferably 0.5 to 10 parts by weight relative to 100 parts by weight of the polyoxyalkylene-based polymer (A).

The production method of the curable composition described above is not particularly limited, and a general method including blending the above-mentioned components, kneading the mixture using a mixer, a roll, a kneader and the like at ambient temperature or under heating, or dissolving the components using a small amount of a suitable solvent and mixing same can be employed.

The curable composition is a transparent curable composition. The transparency can be defined by total light transmittance. Specifically, the curable composition is elongated to have a thickness of 5 mm to prepare a test specimen with smooth surface, and the total light transmittance and haze are measured by using the obtained test specimen. In one or more embodiments, after aging for 10 days at conditions including 23° C., 50% R.H. followed by curing, a test specimen is prepared. For the cured product, the total light transmittance and haze are measured by using a color and turbidity meter (manufactured by NIPPON DENSHOKU INDUSTRIES CO., LTD.). The total light transmittance indicates a value that is obtained by dividing total light amount passed through a test specimen by incident light amount, and a higher transmittance value corresponds to higher transparency. Specifically, the curable composition that can give a test specimen having the total light transmittance of 70% or higher as measured at the above conditions is defined to be transparent and, in one or more embodiments, a cured product of a transparent curable composition is defined as a transparent cured product.

In one or more embodiments, the curable composition can be used as a sealing material, an adhesive, a pattern-making agent, a vibration-proof material, a damping material, an acoustic insulation, a foamed material, paint, a spraying material and the like for structures, boats and ships, automobiles, roads and the like. A cured product obtained by curing the curable composition is excellent in flexibility and adhesiveness, and thus, among those applications, it is more preferably used as a sealing material or an adhesive.

In addition, in one or more embodiments it can be used for various uses including electric or electronic component materials such as solar battery rear surface sealant and the like, electrical insulating materials such as insulation covering material for electric wire or cable and the like, elastic adhesive, contact-type adhesive, spray-type sealing material, crack repairing material, tiling adhesive, powder coating, casting material, medical rubber material, medical adhesive, medical equipment sealing material, food packaging material, joint sealing material for jacket material such as sizing board and the like, coating material, primer, conductive material for shielding electromagnetic wave, thermally conductive material, hot melt material, electric/electronic potting agent, film, gasket, various molding material, as well as rustproof or waterproof sealing material for wire glass or laminate glass end surface (cut section), liquid sealant used for automobile parts, electric parts, various machine components and the like. Moreover, either singly or with the aid of a primer, it can be closely adhered to a wide range of substrates such as glass, porcelain, wood, metal, resin molded products and the like, and thus it can also be used as various types of tight-sealing composition or adhesive composition. Furthermore, the curable composition can be used as adhesive for interior panels, adhesive for exterior panels, tiling adhesive, stone finishing adhesive, ceiling finishing adhesive, floor finishing adhesive, wall finishing adhesive, vehicle paneling adhesive, adhesive for assembly of electric or electronic or precision equipment, sealing material for direct glazing, multi-layer glass sealing material, sealing material for SSG method, sealing material for structure working joints or water-proof material combinedly using asphalt.

EXAMPLES

Next, one or more embodiments of the present invention are illustrated through Examples and Comparative Examples, but the present invention is not limited to them.

Synthesis Example 1

Polymerization of propylene oxide was carried out by using a 1/1 (weight ratio) mixture of polyoxypropylene diol having a molecular weight of about 2,000 and polyoxypropylene triol having a molecular weight of about 3,000 as an initiator and a zinc hexacyanocobaltate glyme complex catalyst, to obtain polypropylene oxide having a number average molecular weight of about 19,000 (i.e., a molecular weight based on polystyrene as a reference with use of a solution delivery system: HLC-8120GPC manufactured by Tosoh Corporation, column: TSK-GEL H type manufactured by Tosoh Corporation, and solvent: THF). Subsequently, a methanol solution of NaOMe in an amount of 1.2 molar equivalents relative to the hydroxy group of the terminal hydroxy group-containing polypropylene oxide was added, methanol was removed by distillation, and allyl chloride in an amount of 1.7 molar equivalents relative to the hydroxy group was added to convert the terminal hydroxy group to an allyl group.

n-Hexane (300 parts by weight) and water (300 parts by weight) were added and mixed with the obtained unpurified allyl-terminal polypropylene oxide (100 parts by weight), and water was removed by centrifugation to obtain a hexane solution. The obtained hexane solution was further added with water (300 parts by weight) and the obtained mixture was stirred. Water was removed again by centrifugation, and the hexane was removed by evaporation under reduced pressure. According to the above, allyl group-terminal polypropylene oxide having a number average molecular weight of about 19,000 was obtained.

Thus-obtained allyl group-terminal polypropylene oxide (100 parts by weight) was reacted with methyldimethoxysilane (1.35 parts by weight) at 90° C. for 2 hours, using an isopropanol solution (150 ppm) of platinum vinylsiloxane complex with platinum content of 3% by weight as a catalyst to obtain polyoxypropylene-based polymer (A-1) which has 1.7 methyldimethoxysilyl groups on average.

Example 1

100 Parts by weight of the polyoxypropylene-based polymer (A-1) having a reactive silicon group which has been obtained in Synthesis Example 1, 0.4 parts by weight of a hindered-amine-based photostabilizer having long chain unsubstituted hydrocarbon group (manufactured by SONGWON, product name: Sabostab UV91: 2,2,6,6-tetramethyl-4-piperidylstearate), 0.6 parts by weight of benzotriazole-based ultraviolet absorbing agent (manufactured by SONGWON, product name: Songsorb 3260: 2-(2-hydroxy-3-tert-butyl-5-methylphenyl)-5-chlorobenzotriazole), 55 parts by weight of diisonoylphthalate (manufactured by J-PLUS Co., Ltd., product name: DINP) as a plasticizer, and 25 parts by weight of hydrophobic fumed silica (manufactured by Nippon Aerosil Co., Ltd., product name: AEROSIL R974) were weighed, admixed with one another using a planetary mixer for sufficient kneading, and then dispersed by passing 3 times the mixture through three paint rolls. After that, dehydration under reduced pressure was carried out for 2 hours at 120° C. followed by cooling at 50° C. or lower. Then, 3 parts by weight of vinyltrimethoxysilane (manufactured by EVONIK, product name: Dynasylan VTMO) as a dehydrating agent, 3 parts by weight of 3-aminopropyltrimethoxysilane (manufactured by EVONIK, product name: Dynasylan AMMO) as an adhesiveness imparting agent, and finally 1 part by weight of dibutyl tin-based curing catalyst (manufactured by Momentive Performance Materials, product name: FOMREZ SUL-11C) as a curing catalyst were added and kneaded, and then sealed in a moisture-proof cartridge in a state in which moisture is substantially absent. Accordingly, a 1-component type curable composition was obtained.

Example 2

Except that 0.6 parts by weight of oxanilide-based ultraviolet absorbing agent (manufactured by SONGWON, product name: Songsorb 3120: N-(2-ethoxyphenyl)-N'-(4-ethylphenyl)-ethylenediamide) was used instead of Songsorb 3260 of Example 1, the curable composition was obtained in the same manner as Example 1.

Example 3

Except that the use amount of Sabostab UV91 in Example 1 was changed to 0.7 parts by weight and 0.3 parts by weight of triazine-based ultraviolet absorbing agent (manufactured by SONGWON, product name: Songsorb 1577: 2-[4,6-diphenyl-1,3,5-triazin-2-yl]-5-(hexyloxy)phenol) was used instead of Songsorb 3260 of Example 1, the curable composition was obtained in the same manner as Example 1.

Comparative Example 1

Except that 0.4 parts by weight of hindered-amine-based photostabilizer (manufactured by SONGWON, product name: Sabostab UV70: sebacic acid bis(2,2,6,6-tetramethyl-4-piperidyl)) was used instead of not using Sabostab UV91 in Example 1, the curable composition was obtained in the same manner as Example 1.

Comparative Example 2

Except that the use amount of Songsorb 3260 was modified to 1 part by weight and the use amount of Sabostab UV70 in Comparative Example 1 was modified to 1 part by weight, the curable composition was obtained in the same manner as Comparative Example 1.

Comparative Example 3

Except that Sabostab UV70 was used in an amount of 0.4 parts by weight instead of not using Sabostab UV91 in Example 2, the curable composition was obtained in the same manner as Example 2.

Comparative Example 4

Except that 0.4 parts by weight of a hindered-amine-based photostabilizer (manufactured by SONGWON, product name: Sabostab UV119: N,N',N'',N'''-tetrakis(4,6-bis(butyl-(N-methyl-2,2,6,6-tetramethylpiperidin-4-yl)amino)triazin-2-yl)-4,7-diazadecane-1,10-diamine) was used instead of not using Sabostab UV91 in Example 1, the curable composition was obtained in the same manner as Example 1.

Comparative Example 5

Except that 0.2 parts by weight of a hindered-amine-based photostabilizer (manufactured by SONGWON, product name: Sabostab UV62: dimethyl succinic acid 1-(2-hydroxyethyl)-4-hydroxy-2,2,6,6-tetramethyl-4-piperidine polycondensate) and 0.2 parts by weight of a hindered-amine-based photostabilizer (manufactured by BASF, product name Tinuvin 144: bis(1,2,2,6,6-pentamethyl-4-piperidyl) [[3,5-bis(1,1-dimethylethyl)-4-hydroxyphenyl]methyl] butylmalonate) were used instead of not using Sabostab UV91 in Example 1, the curable composition was obtained in the same manner as Example 1. With the curable compositions that are obtained from above Examples 1 to 3 and Comparative Examples 1 to 5, a cured product was prepared, and the initial color (b value) and the color after storing the cured product for 6 months in 70° C. state were measured. Furthermore, the accelerated weather resistance test was carried out for the cured product.

Furthermore, by using the curable compositions which have been obtained from above Examples and Comparative Examples, a test specimen of cured product having thickness of 5 mm and smooth surface was prepared. As a result, total light transmittance of 70% or higher was shown from any test specimen, and the test specimen was transparent.

(Production of Cured Product)

The curable composition was prepared as a sheet-like test subject with thickness of 3 mm, and then, by carrying out curing aging for 3 days at 23° C., 50% RH followed by 4 hours in a 50° C. dryer, a cured product was obtained.

(Heat Resistance of Cured Product)

The cured product with thickness of 3 mm was cut to a rectangular shape of about 30 mm×40 mm, and then placed in an oven which has been set at 70° C. Coloration of the cured product was evaluated at each constant time point.

(Evaluation of Coloration)

By using Chroma meter CR-400 (manufactured by Konica Minolta, Inc.), the yellowness feel b value on a surface of the cured product was measured. Higher b value indicates stronger yellowness feel. The results are shown in Table 1.

(Weather Resistance on Surface of Cured Product)

The cured product with thickness of 3 mm was cut to a rectangular shape of about 30 mm×40 mm, and then placed in QUV Accelerated Weathering Tester (manufactured by Q-Lab). Then, the surface state was checked at each constant time point. Accordingly, the time till to have an occurrence of crack on a surface of the cured product was measured.

TABLE 1

| | | | Example | | | Comparative Example | | | | |
|---|---|---|---|---|---|---|---|---|---|---|
| | | | 1 | 2 | 3 | 1 | 2 | 3 | 4 | 5 |
| (A) | Polyoxyalkylene containing silicon group | Polymer (A-1) | 100 | 100 | 100 | 100 | 100 | 100 | 100 | 100 |
| (B) | Weathering stabilizer having specific structure | Sabostab UV91 | 0.4 | 0.4 | 0.7 | | | | | |
| | Benzotriazole-based ultraviolet absorbing agent | Songsorb 3260 | 0.6 | | | 0.6 | 1 | | | |
| | Oxanilide-based ultraviolet absorbing agent | Songsorb 3120 | | 0.6 | | | | 0.6 | 0.6 | 0.6 |
| | Triazine-based ultraviolet absorbing agent | Songsorb 1577 | | | 0.3 | | | | | |
| | Hindered-amine-based photostabilizer | Sabostab UV70 | | | | 0.4 | 1 | 0.4 | | |
| | Hindered-amine-based photostabilizer | Sabostab UV119 | | | | | | | 0.4 | |
| | Hindered-amine-based photostabilizer | Sabostab UV62 | | | | | | | | 0.2 |
| | Hindered-amine-based photostabilizer | Tinuvin 144 | | | | | | | | 0.2 |
| | Plasticizer | Diisononyl phthalate | 55 | 55 | 55 | 55 | 55 | 55 | 55 | 55 |
| (D) | Silica | Aerosil R974 | 25 | 25 | 25 | 25 | 25 | 25 | 25 | 25 |
| | Dehydrating agent | Dynasylan VTMO | 3 | 3 | 3 | 3 | 3 | 3 | 3 | 3 |
| (C) | Adhesiveness imparting agent | Dynasylan AMMO | 3 | 3 | 3 | 3 | 3 | 3 | 3 | 3 |
| | Curing catalyst | SUL-11C | 1 | 1 | 1 | 1 | 1 | 1 | 1 | 1 |
| | Initial b value of cured product | | 6.4 | 4.5 | 5.7 | 6.9 | 9.4 | 4.7 | 5.1 | 7.1 |
| Heat resistance | b value of cured product after storage for 6 months at 70° C. | | 26.5 | 25.3 | 27.7 | 31.6 | 33.1 | 26.3 | 30.6 | 26.6 |
| | Determination | | Good | Good | Good | Fair | Fair | Good | Fair | Good |
| Weather resistance | Time till to have occurrence of crack on cured product surface (hours) | | 5500 | 4750 | 4500 | 4000 | 5500 | 3000 | 3250 | 3500 |

Examples 1 to 3 are related to a transparent curable composition in which the weathering stabilizer (B) with a specific structure having a long chain unsubstituted hydrocarbon group is used, and the cured product of the composition showed little coloration both at initial stage and after the heat resistance evaluation. Furthermore, over a long period of time of the weather resistance test, a favorable surface state was maintained. In particular, Example 1 in which the component (B) and a benzotriazole-based ultraviolet absorbing agent are used in combination showed high weather resistance. On the other hand, as shown in Comparative Examples 1, 3, 4, and 5, when the component (B) is not used, a cured product that is satisfactory in terms of coloration or weather resistance was not obtained even when 2 kinds of a weathering stabilizer are used in combination. Although good weather resistance is shown in Comparative Example 2, the weathering stabilizer was used at a 2-fold amount, which is different in this blending, and also the initial cured product shows a yellowness feel, and therefore not desirable.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A transparent curable composition, comprising:
   100 parts by weight of a polyoxyalkylene-based polymer (A);
   0.1 to 20 parts by weight of a weathering stabilizer (B); and
   0.1 to 20 parts by weight of an amino group-containing silane coupling agent (C),
   wherein the polyoxyalkylene-based polymer (A) is the only resin contained in the transparent curable composition,
   wherein the polyoxyalkylene-based polymer (A) has a reactive silicon group that can be crosslinked by forming a siloxane bond,
   wherein the weathering stabilizer (B) is a hindered-amine-based photostabilizer (B1), and
   wherein the hindered-amine-based photostabilizer (B1) is represented by the following formula:

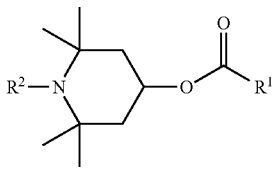

wherein $R^1$ is an unsubstituted hydrocarbon group having 12 to 20 carbon atoms, and $R^2$ is a hydrogen atom, a methyl group, an ethyl group, or an alkyloxy group having 1 to 12 carbon atoms.

2. The curable composition of claim 1, wherein the polyoxyalkylene-based polymer (A) is a polyoxypropylene-based polymer.

3. The curable composition of claim 1, wherein the reactive silicon group of the polyoxyalkylene-based polymer (A) is at least one selected from the group consisting of a trimethoxysilyl group, a triethoxysilyl group, and a dimethoxymethylsilyl group.

4. The curable composition of claim 1, wherein the polyoxyalkylene-based polymer (A) comprises a polyoxyalkylene-based polymer (A1) with a linear structure and a polyoxyalkylene-based polymer (A2) with a branched structure.

5. The curable composition of claim 1, further comprising an ultraviolet absorbing agent.

6. The curable composition of claim 1, further comprising 0.1 to 20 parts by weight of silica (D).

7. The curable composition of claim 1, wherein a moisture content of the curable composition is 2000 ppm or less.

8. A sealing material comprising the curable composition of claim 1.

9. An adhesive comprising the curable composition of claim 1.

10. A coating material comprising the curable composition of claim 1.

11. A water-proof material comprising the curable composition of claim 1.

12. A transparent cured product of the curable composition of claim 1.

13. The transparent cured product of claim 12, wherein a 5 mm thick sample of the transparent cured product has a total light transmittance of 70% or higher.

14. The curable composition of claim 1, wherein the curable composition allows obtainment of a transparent cured product within 7 days of curing, wherein a 5 mm thick sample of the transparent cured product has a total light transmittance of 70% or higher.

* * * * *